(12) United States Patent
Nishihara

(10) Patent No.: US 7,324,511 B2
(45) Date of Patent: Jan. 29, 2008

(54) DEVICE, METHOD AND SYSTEM FOR TRANSFERRING FRAME

(75) Inventor: Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 1301 days.

(21) Appl. No.: 09/925,707

(22) Filed: Aug. 10, 2001

(65) Prior Publication Data

US 2002/0018468 A1    Feb. 14, 2002

(30) Foreign Application Priority Data

Aug. 10, 2000   (JP)   ............................. 2000-243275

(51) Int. Cl.
*H04L 12/28*   (2006.01)
(52) U.S. Cl. ...................................... 370/389; 370/907
(58) Field of Classification Search ................ 370/232, 370/230, 412, 468, 470, 471
See application file for complete search history.

(56) References Cited

U.S. PATENT DOCUMENTS

| | | | | |
|---|---|---|---|---|
| 5,140,582 A * | 8/1992 | Tsuboi et al. | ................ | 370/416 |
| 5,282,202 A * | 1/1994 | Bernstein et al. | ............ | 370/468 |
| 5,608,733 A * | 3/1997 | Vallee et al. | ................. | 370/394 |
| 6,023,453 A * | 2/2000 | Ruutu et al. | .................. | 370/229 |
| 6,442,145 B1 * | 8/2002 | De Lange et al. | ........... | 370/310 |
| 6,570,883 B1 * | 5/2003 | Wong | .......................... | 370/412 |
| 6,700,875 B1 * | 3/2004 | Schroeder et al. | ........... | 370/252 |
| 6,771,663 B1 * | 8/2004 | Jha | .............................. | 370/473 |
| 6,775,305 B1 * | 8/2004 | Delvaux | ...................... | 370/535 |
| 6,847,644 B1 * | 1/2005 | Jha | .............................. | 370/392 |
| 6,868,061 B1 * | 3/2005 | Kilkki et al. | ............. | 370/230.1 |
| 6,882,634 B2 * | 4/2005 | Bagchi et al. | ............... | 370/338 |
| 6,970,478 B1 * | 11/2005 | Nishihara | .................... | 370/474 |

FOREIGN PATENT DOCUMENTS

JP          2000-22733         1/2000

OTHER PUBLICATIONS

Yamada et al, Unified Transport Network for Future Peta Bit Network, IEEE, pp. 25-32, Jun. 2000.*
Golmie et al, A Differentiated Optical Services Model for WDM Networks, IEEE, pp. 1-13, 2000.*
Takagi et al, A Proposal of New Data Link Protocol, Universal Data Link, for High-Speed IP/ATM-Hybrid and IP-Centric Transport Networks, IEEE, pp. 1259-1263, 2001.*

* cited by examiner

*Primary Examiner*—Frank Duong
(74) *Attorney, Agent, or Firm*—Young & Thompson

(57) ABSTRACT

In between network devices interconnected by plural optical channels, logical paths are defined according to upper traffic and also priority of the traffic. The network device includes: a frame forming section for reading user packets out of a buffer section composed of plural buffers defined for the respective paths on transfer schedule, and forming path frames having a specified frame length and individual ordinal numbers with respect to each path; a switch for selecting output channels to equally distribute the path frames by round robin scheduling; and data transmitting part for transmitting data on the logical paths. Thus, it is made possible to realize a frame transfer system capable of performing data transmission, which satisfies QOS (Quality Of Service) required for user traffic, on the WDM networks connected by plural OCHs.

52 Claims, 17 Drawing Sheets

PARAMETER LIST
REQUIRED DELAY TIME=T
REQUIRED BAND=V
VELOCITY OF OCH=R
TRANSFER TIME ON OCH=τ
CONTENTS OF DELAY AT POINTS ①–⑤
①=PATH FRAME LENGTH÷V
②=PATH FRAME LENGTH÷R
③=τ
④=PATH FRAME LENGTH÷R
⑤=PATH FRAME LENGTH÷V
NECESSARY CONDITION
T>①+②+③+④+⑤ :
T>τ+2×PATH FRAME LENGTH × (1/V+1/R)

DEVICE, METHOD AND SYSTEM FOR TRANSFERRING FRAME

BACKGROUND OF THE INVENTION

The present invention relates to a device, a method and a system for transferring frames in data transmission between network systems which are interconnected by plural OCHs (Optical Channels), using optical channels on the light wavelength division multiplexing network where data of various volumes of traffic are transferred.

DESCRIPTION OF THE RELATED ART

WDM (Wavelength Division Multiplexing) has come to the fore as a technique for increasing transmission capacity per an optical fiber by multiplexing signals with the use of different wavelengths. In the WDM, plural OCHs (Optical Channels) connect a network system to the opposite network system. The OCH is defined in the recommendation of ITU-T, G.872, etc. as a channel used for transferring user signals according to each wavelength.

At the same time, with the progress of optical devices relating to the WDM, it has become possible to establish an OCH connection between network systems and disconnect it at a high speed. Consequently, it is required to realize an optimum configuration of the OCH connection for data transmission by gearing the connection topology of the OCH to deviation in traffic.

In addition, IXC (Inter Exchange Carrier), which offers end-to-end transfer bands as service, is in the process of starting the business of dealing in transfer bands by the hour. Accordingly, it is also required to provide data transmission system that allows any volumes of traffic from heavy traffic to little traffic in a simple configuration.

Against this background, flexible data transmission corresponding to the deviation in a variety of user traffic, such as IP (Internet Protocol), ATM (asynchronous transfer mode), and SDH (synchronous digital hierarchy), is required of the WDM, which affords the high-speed and high-capacity transfer functions. However, conventional techniques being applied to the user traffic cannot be directly used to equalize the traffic on OCHs.

For example, by the technique of distributing flow at the IP layer employed on the IP network, in between end-to-end terminals, it is impossible to estimate traffic characteristics and timing of generation/extinction of a flow: a group of forward packets produced in the session process of applications operated at respective terminals, in the IP layer beforehand, because the generation and extinction depend on working between an application and an operator. Besides, when the order of packets in a flow counterchanges, retransmission of the packets occurs at the TCP layer: an upper layer of the IP layer, and thus throughput capacity is remarkably deteriorated.

Moreover, there is another problem in applying the IP layer flow distribution to plural OCHs. In the IP, it is necessary to select one of OCHs for each flow, along with transfer packets in the same flow onto the same OCH. However, the characteristics and volume of traffic, etc. are unpredictable as described above, and therefore data traffic is not to be equally distributed to respective OCHs by the IP flow distribution as it is. Furthermore, since the number of flow amounts to the millions on the backbone network, it is difficult to manage the flow, and also device costs increase.

On the other hand, in the case of equalizing traffic on OCHs by using the ATM technique, wherein a packet: a basic unit of data traffic to be transmitted, is divided into ATM cells and transferred onto OCHs, prescribed numbers of ATM-VCs (Virtual Channel) are fixedly set up for each OCH in advance to distribute flow to the OCHs. Then, after IP flow are detected, the packets included in each flow are allocated to each ATM-VC (mapping), and thereby the flow distribution to plural OCHs is implemented.

Namely, the function of the ATM layer is framing only, and the judging process in the flow distribution is executed at the IP layer. Therefore, the ATM layer has the same drawbacks as that of the IP layer in the flow distribution. Moreover, it is necessary to add a cell header of bytes to the ATM cell per 48 bytes data, which decreases the efficiency of an effective band on a channel.

In the Virtual Concatenation proposed in T1X1.5, a fixed range of an STM band is divided into frame units of SDH such as VT1.5, VC3, and VC4 at the transmitting end on the network. The respective frames are transferred onto different OCHs, and reassembled at the receiving end to restore the original STM band.

In this STM transmission, J1, H4 bite of a frame header is occupied by information to identify the order of frames, the original STM band (path) and the like, and it is possible to transmit STM bands of 1.5 Mbps×N (N: arbitral natural number), 50 Mbps×N, 150 Mbps×N, and 2.4 Gbps×N, irrespective of the prescribed velocity on OCHs, for example, OC-3 (150 Mbps), OC-12 (600 Mbps), OC-48 (2.4 Gbps), and OC-192 (10 Gbps).

However, the Virtual Concatenation is just a technique for the STM transmission, and the effect of statistical multiplexing is not to be obtained in the case of transmitting user data to plural OCHs. Consequently, reduction in link cost achieved by the statistical multiplexing effect cannot be realized.

Besides, the technique has another disadvantage in that, when an error occurs in an OCH connection, it is necessary to back up the whole STM band to restore the connection. Therefore, it is impossible to continue data transfer service through only usable OCHs to perform efficient data transmission.

In addition, Japanese Patent Application Laid-Open No. 2000-22733 "Data Communication System and Device for Connecting Networks Thereof": the prior art of the present invention, discloses a data communication system in which plural network connecting devices and lines connect a base, or point, to another, distributing data traffic to lines between the bases, or points, and controlling the order of the distributed data. That is, the prior art comprises the first connecting device for controlling distribution of data according to the transmission speed of each line, and the second connecting device for controlling the order of the distributed data.

In the prior art, however, the first connecting device distributes data to the device itself and the second connecting device depending on the amount of accumulated data, which complicates the processing protocol. Thus, the prior art is not suitable for high-speed data transmission.

As set forth hereinabove, in data transmission technique such as IP, ATM, and SDH, equalization of data traffic on OCHs, which are set for respective wavelengths defined in the WDM, is not taken into consideration. For the same reason, the prior art described in Japanese Patent Application Laid-Open No. 2000-22733 has a drawback of being inapplicable to data transmission on OCHs at this stage.

SUMMARY OF THE INVENTION

It is therefore an object of the present invention to provide a device, a method and a system for transferring frames, capable of performing flexible data transmission corresponding to traffic on each OCH on the light WDM network, where various volumes of user traffic is transferred at a high speed, and affording quality communication that satisfies user's demand.

For achieving the above object, the present invention defines paths depending on the quality of service (QOS) necessary for user data transferred between network devices, which are connected by plural OCHs, and besides defines plural OCHs as a virtual link by adopting new frames called path frames and a frame transferring system for data transmission on the paths. Within the virtual link, a transfer band having arbitrary transfer rate is realized in each path. Moreover, there is provided a means gearing wavelength control to data transmission at the time of switching OCHs and Protection.

The present invention, in the communication network where data is transferred between network devices that are connected by plural physical channels, in particular optical channels, includes a means which defines logical paths varied with user traffic and the priority of the traffic in between the network devices, and forms path frames having a specified frame length and operating on transfer schedule for each of the logical paths to transfer data.

Moreover, the network device transmitting path frames includes a means that uses plural optical channels as a virtual path to transfer the path frames of each logical path, and transfers the path frames equally to the optical channels corresponding to each path according to the condition of the optical channels.

Furthermore, the network device transmitting path frames includes a buffer for storing data for each logical path individually; and a switch for selecting optical channels to output the path frames thereto based on identification information attached to each path frame, and outputting the path frames to the optical channels by round robin scheduling.

The logical path accommodates user packets and forms path frames. In addition, the path is terminated by an ingress network device, which sends data onto the light WDM network, and an egress network device, which terminates the path frames and restores the frames to the user packets.

The ingress network device includes: a buffer for storing user packets of each logical path individually; a frame forming means for reading the user packets out of the buffer, and forming the path frames which have a fixed frame length and individual ordinal numbers; and a switch for outputting the path frames to the optical channels by round robin scheduling.

The egress network device includes: a frame restoring means for receiving the path frames from the optical channels and writing the frames of each path individually into a buffer at a subsequent stage; and a packet restoring means for restoring the path frames written in the buffer to the user packets according to the ordinal number attached to each path frame.

The path frame includes: a field for storing a path number to identify its logical path at the header part; a field for storing the ordinal number attached to the path frame at every time of forming the frame; and a pointer field for indicating the positional information of the first user packet, which is stored in the payload part of the path frame.

The Egress network device includes: a means for reading frames into a buffer at a subsequent stage using the ordinal number stored in each path frame at a frame restoring section; a means for retrieving the first user packet stored in the path frame with reference to a pointer value of the path frame, and a means for identifying the position of the head of the next user packet stored in the path frame with reference to packet length information stored in the user packet retrieved before and retrieving the new user packet at a packet restoring section where the path frames in the buffer are restored to the user packets.

The network device includes: a means for transmitting a control frame to indicate the initiation of data transmission on the occasion of setting a new optical channel connection between the network devices, and a means for transmitting a control frame to indicate the termination of data transmission on the occasion of disconnecting an existing optical channel connection.

In the transmission of the control frames, transmission control is performed according to increase and decrease in traffic between the network devices.

Besides, in the transmission of the control frame, transmission control is performed according to detection of errors in specified optical channels between the network devices.

The path frame length and transfer cycle are set according to an allowable delay period and burst property of user traffic.

The network device includes a means for requesting disposal or retransmission of a frame, when an error is detected in the frame.

The logical path comprises: an input network device (Ingress) which accommodates user packets, forms path frames, and transfers the path frames onto the light WDM network; an output network device (Egress) which terminates the path frames, and restores the path frames to user packets; a relay network device (Core) which relays the path frames; and optical channels, each of which is defined for each light wavelength, and connects the network devices.

As set forth herein above, according to the present invention, in regard to technique of data transmission between network devices that are connected by plural OCHs: a logical path is newly defined for each class of traffic (ATM, STM, IP packet, and MPLS packet), and also its priority; the logical path is related to OCHs; path frames are defined in the path as frames transferring data; a frame length and frame transmission schedule of the path frames are decided on each logical path individually; the frames are transferred according to traffic on the OCHs related to each logical path in a layer 1; and there is provided a transfer control means. Thus, it is made possible to provide a device, a method and a system capable of equalizing the traffic on OCHs.

Moreover, according to the present invention, in regard to the technique of data transmission between network devices that are connected by plural OCHs: a path is defined based on the class of traffic (ATM, STM, IP packet, and MPLS packet), and further, its priority; path frames having a fixed frame length and frame transmission schedule are defined for the path; plural OCHs can be used as a virtual link; a user can utilize any necessary band irrespective of restrictions on the number and transfer rate etc. of OCHs; and even when there are plural paths in the virtual link, the frame length and frame transmission schedule can be defined for each path. Consequently, it is made possible to accommodate various types of user traffic in the virtual link as well as satisfy transmission QOS necessary for each user traffic by relating the transmission QOS with QOS of a path.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
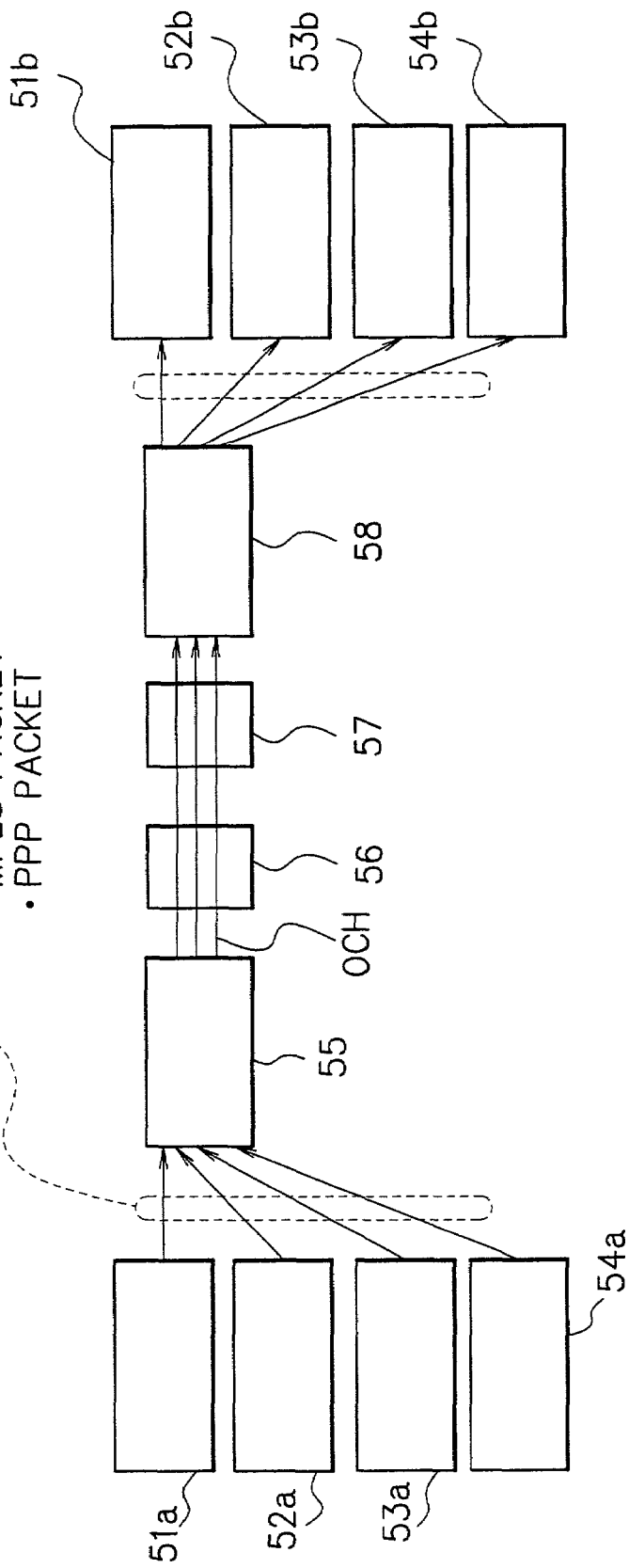
FIG. 1 is a diagram showing a configuration of a network where the present invention is applied

In the following, configurations of networks to which the present invention is applied, and an outline of the present invention will be described. FIG. 1 shows an example of a network model to which the present invention is applied. In FIG. 1, plural OCHs, which correspond to wavelengths of WDM, connect a network device (Ingress) 55 and another network device (Egress) 58. The Ingress 55 receives various user data from user devices such as an ATM cross connecter 51A, an IP router 52A, a switcher 53A, and a multiplexer 54A. As examples for the user data, there are ATM cells from the ATM cross connecter 51A, IP packets and MPLS (Multi-protocol Label Switching) packets from the IP router 52A, and STM (Synchronous Transfer Mode) signals such as SDH (Synchronous Digital Hierarchy) and PDH (Pre-synchronous Digital Hierarchy) from the switcher 53A and multiplexer 54A.

The Ingress 55 retrieves only valid data from the user data, and judges QOS in data transmission. After that, the Ingress 55 stores user packets in path frames defined in between the Ingress 55 and a network device (Egress) 58, and transfers the path frames onto plural OCHs, the detail of which will be described later.

The path frames transferred onto OCHs are transferred to the Egress 58 via an OXC (Optical Cross-connecter) 56 or an OADM (Optical Add-Drop Multiplexer) 57, which have the OCH transmission function on the networks.

Having terminated the path frames, the Egress 58 retrieves the user data stored in the path frames, and transfers ATM cells, IP packets and MPLS packets, and STM signals, etc. to the opposite user devices: an ATM cross connecter 51B, an IP router 52B, a switcher 53B, and a multiplexer 54B, respectively.

The network devices Ingress 55 and Egress 58 are described individually and differently in this description. However, they are actually the same devices on the input side and output side on the connection with the user devices, and each device has both Ingress and Egress functions.

According to the present invention, a concept of paths is defined between the Ingress 55 and Egress 58.

The path varies with the type of upper traffic (ATM cells, IP packets, MPLS packets, PPP packets, and STM data) to be transferred between the Ingress 55 and Egress 58, and also priority of the traffic.

Figure 2:
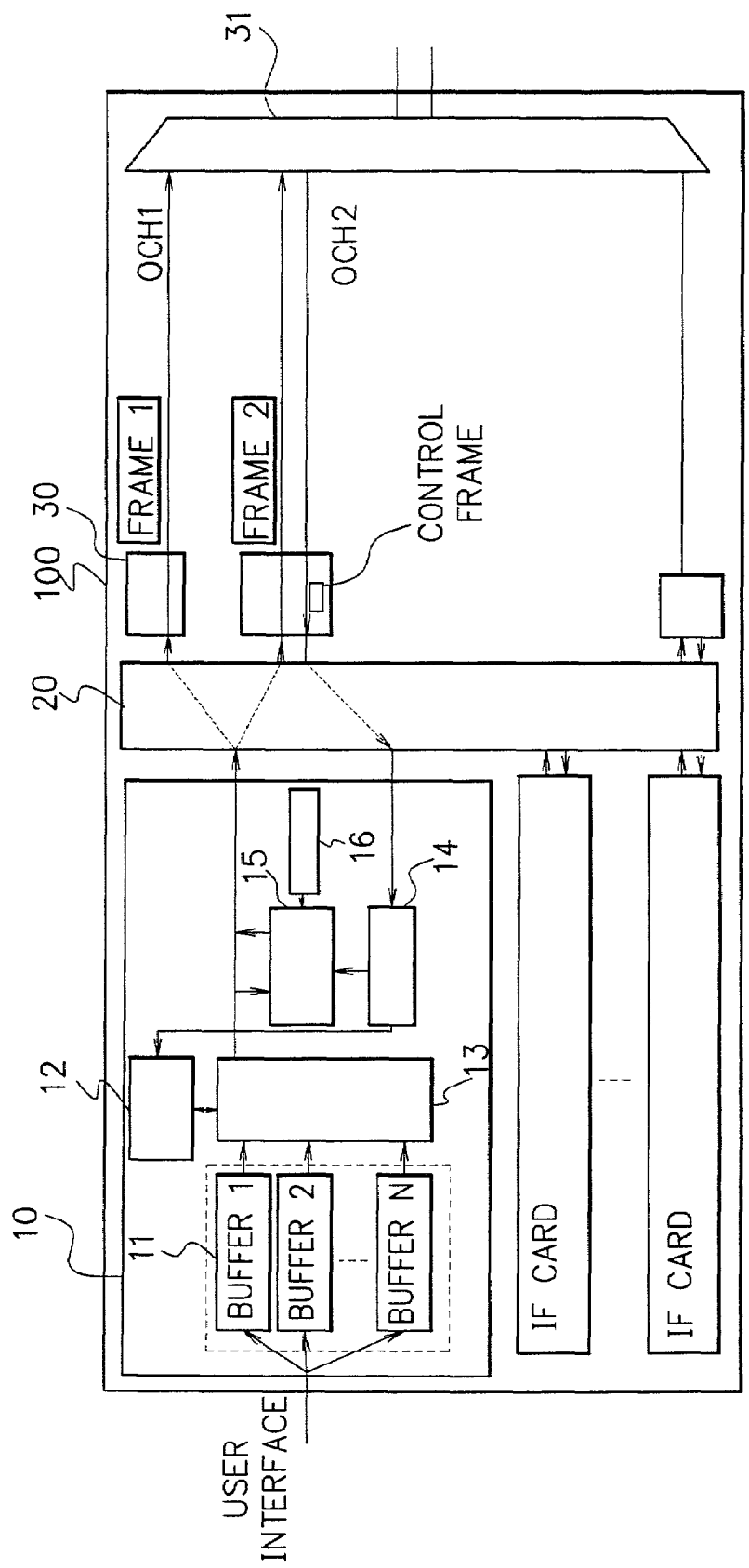
FIG. 2 is a diagram showing a configuration of a network device (Ingress) according to an embodiment of the present invention.

FIG. 2 shows a configuration of a network device (Ingress) 100, which corresponds to the Ingress 55 in FIG. 1.

The Ingress 100 comprises: IF cards 10 each providing an interface to a user device, WDM cards 30 each providing an interface to the light WDM network, and a frame switch 20 for switching path frames transferred between the network devices (Ingress/Egress) only.

The IF card 10 includes: a buffer section 11, a scheduling section 12, a frame forming section 13, a standby buffer 15, a retransmission controller 14, and a timer 16. In the IF card 10 of FIG. 2, the buffer section 11 is provided with individual buffers, or FIFO (First In First Out) memories, for respective paths.

When the scheduling section on the IF card of the Ingress schedules transmission of path frames and transfers the path frames to plural OCHs with the above configuration, each of the frames with respect to each path is transferred to one of OCHs selected by round robin scheduling according to the ordinal number of the path frame. Consequently, it is made possible to transfer the same number of path frames, or the same volume of traffic, to respective OCHs, and thus plural OCHs are to be used as a virtual link.

Figure 3:
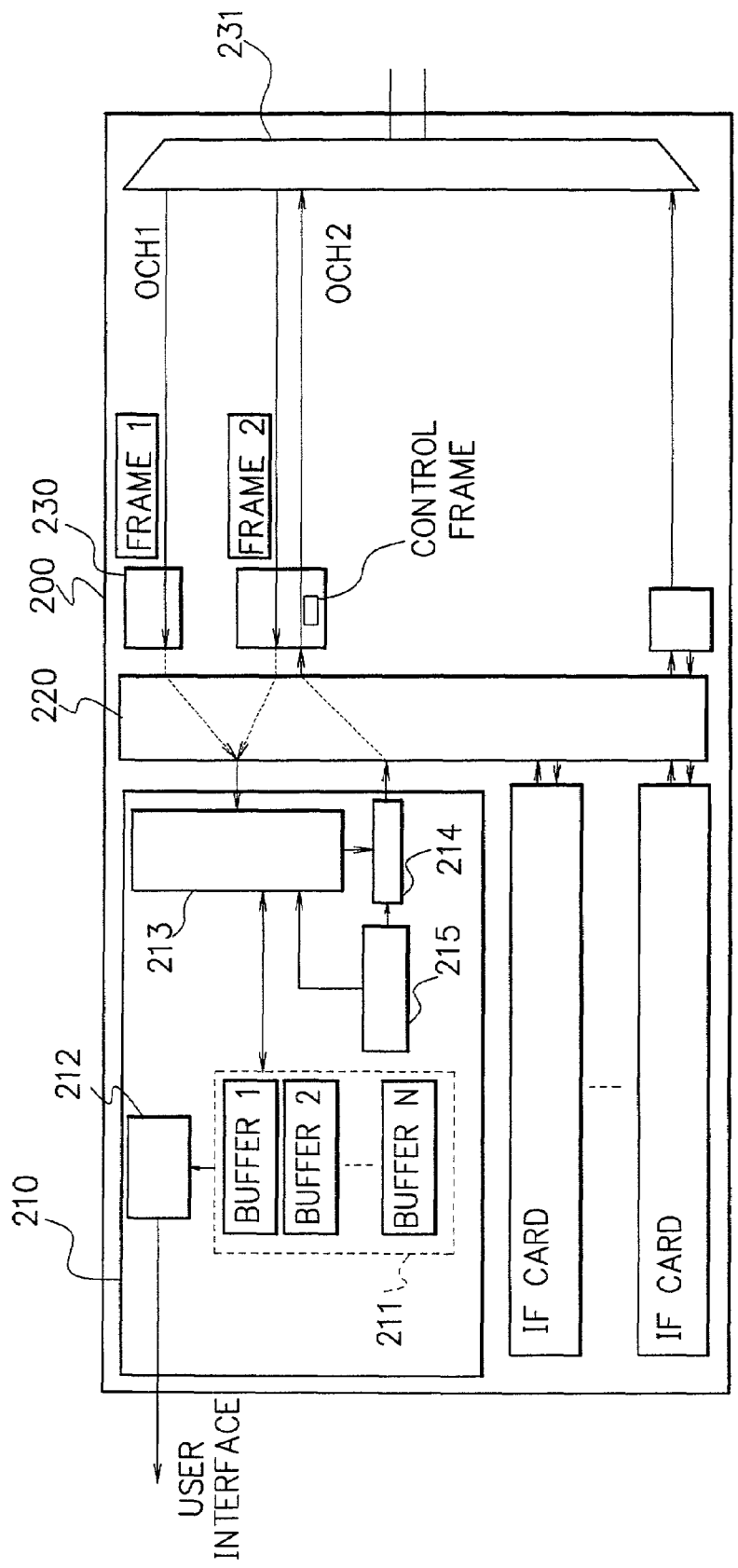
FIG. 3 is a diagram showing a configuration of a network device (Egress) according to an embodiment of the present invention.

FIG. 3 shows a configuration of a network device (Egress) 200. The Egress 200 also comprises: IF cards 210 for providing connections to user devices, WDM cards 230 for providing connections to OCHs, and a frame switch 220 for switching path frames transferred between the network devices (Ingress/Egress) only.

The IF card 20 includes: a buffer section 211, a packet restoring section 212, a frame restoring section 213, a retransmission controller 214, and a timer 215.

The frames are restored, or decoded, as follows. The IF card of the Egress is provided with the buffer section that is composed of individual buffers for paths. Path frames belonging to a path transferred on OCHs are stored in one of the buffers. The frame restoring section reads the path frames out of the buffer according to the ordinal number of each path frame. After that, the packet restoring section retrieves user data based on pointer information of the path frame.

In addition, in case that a frame is lost, the IF card of the Ingress stores the path frames transferred from the frame forming section in the standby buffer for a certain period of time. The timer clocks time, and if there is an instruction to retransmit the lost path frame from the Egress before time out, the retransmission controller reads the path frame out of the standby buffer to retransmit the path frame.

In an embodiment, when OCHs set up between an Ingress and an Egress are inputted/outputted onto the light WDM network, the OCHs are wavelength-multiplexed/demultiPleXed by optical multiplexer/demultiplexer 31 or 231 as shown in FIGS. 2 and 3, accommodated in a optical fiber to be transferred on the light WDM network using different wavelengths. However, as other embodiments, the arbitral number of OCHs may be accommodated in each of the plural optical fibers, or each OCH may be accommodated in the individual fibers.

Figure 4:
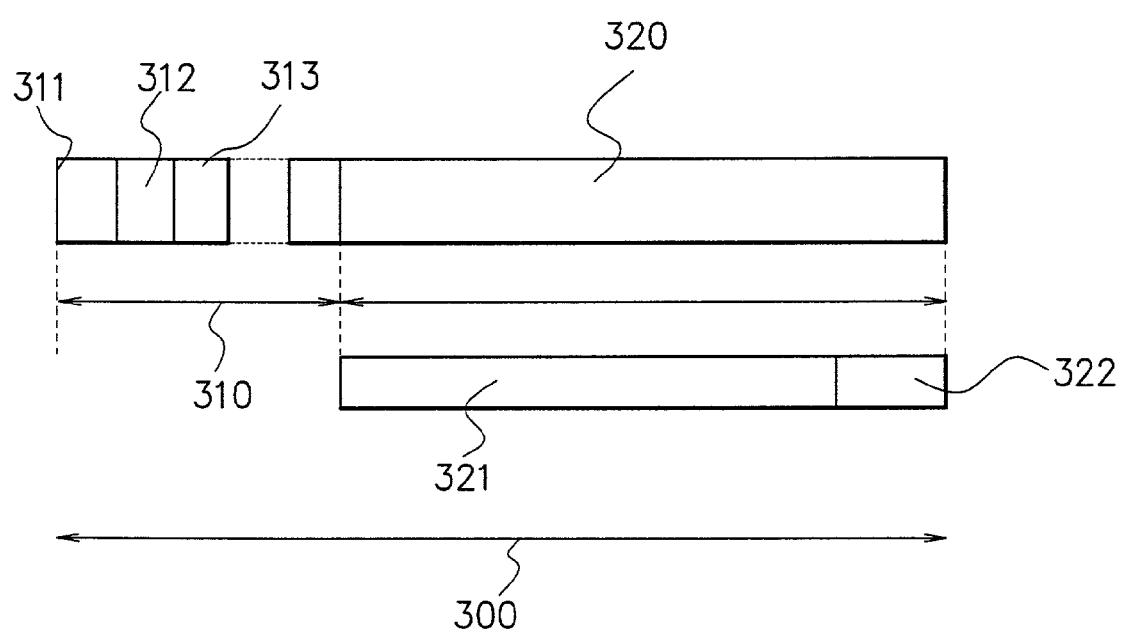
FIG. 4 is a diagram showing a configuration of a path frame according to an embodiment of the present invention.

Path frames having a specified frame length and transfer schedule are defined with respect to each path. FIG. 4 is a detailed diagram showing a configuration of a path frame according to an embodiment of the present invention.

As shown in FIG. 4, the path frame 300 according to an embodiment of the present invention consists of a field of frame header 310 and a field of payload 320. The frame header 310 includes a path number 311, an ordinal number 312, a pointer 313, and other control fields. The payload 320 includes a field 321 where data of actual user traffic are written in, and a field 322 for monitoring data quality. The data field contains user data transferred on the same path.

The pointer 313 is positional information, indicating the head of the first user packet in the data field of a path frame. That is, it indicates the distance from the pointer field to the head of the first user packet. Here, the field of the pointer 313 also contains information for restoring path frames to user packets at the Egress 58. Besides, the ordinal number in the frame header is used for deciding an order relation of path frames, which have been transferred via plural OCHs.

Incidentally, the frame length of path frames is defined for respective paths individually, and path frames on the same path have always a fixed length.

With the above configuration, in accordance with the present invention, the scheduling section on the IF card of the network device (Ingress) schedules transmission of path frames. In the case where the path frames are transferred onto plural OCHs, each frame is transferred to one of OCHs selected by round robin scheduling according to the ordinal number of the path frame with respect to each path. Thereby it is made possible to transfer the same number of path frames, or the same volume of traffic, to respective OCHs, and thus plural OCHs are to be utilized as a virtual link.

According to the present invention, it is possible to define the frame length and frame transfer schedule of path frames for paths individually. Therefore, various types of user traffic in data transmission, such as STM transmission, minimum band transmission, and Best Effort transmission, is frame-multiplexed and transferred onto a virtual link composed of OCHs.

Moreover, on the occasion of connecting/disconnecting an OCH, a start frame or an end frame is transmitted as a control path frame so that path frames are transferred to only active OCHs. Thus, it is made possible to modify OCH connections in the process of data transmission. Furthermore, even when the number of OCHs on a link reduces due to an error(s), transmission of path frames can be continued using only normal OCHs. Therefore, there is no need to prepare spare OCHs.

As is described above, according to the present invention, the frame length and frame transfer scheduling of path frames are defined individually for each path corresponding to user traffic. Consequently, it is made possible to deal with QOS of various types of user traffic in data transmission, such as STM transmission, minimum band transmission, Best Effort transmission, and transmission of data critical about delay.

Moreover, in data transmission according to the present invention, user traffic is uniformly managed by path number. The path number is not defined in each flow of user applications, but defined only for a connection set between transport devices. Thus it is made possible to manage user traffic easily with small number of paths.

Next, operations of an embodiment with the above network devices, paths and path frames will be explained. In the following, the flow of operations from a user device through a network device (Ingress), OCHs, a network device (Egress) to another user device will be described referring to drawings.

First, paths are set in between the Ingress and Egress. Different paths are defined depending on the type of upper traffic (ATM cells, IP packets, MPLS packets, PPP packets, and STM data) to be transferred between the Ingress 55 and Egress 58, and further, priority of the traffic.

When there is difference in the transfer QOS of the same, for example, ATM cell traffic, as the case where ATM-CBR (Constant Bit Rate) and ATM-UBR (Unsustained Bit Rate) are transferred, different paths are defined for each.

Incidentally, any velocity can be defined for a band of each path. A velocity may be applied to plural OCHs as well as just one OCH. Besides, both STM signals and variable record signals can be set as a traffic characteristic of each path.

Second, path frames, which have a specified frame length and transfer schedule, are set for each path. As shown in FIG. 4, the path frame composed of a frame header field and a payload field. The frame header includes a path number, an ordinal number, a pointer, and other control fields. The payload includes a field where data of user traffic are inputted, and a field for monitoring quality of the data. It is possible to set a field for executing detection/correction of bit errors by CRC calculation, which is defined in the AAL5 or SDL etc. of ATM, as the monitoring field.

The path frames are not defined for each user packet, but defined for the whole traffic to be transferred, and much longer than the user packets. Consequently, it is made possible to minimize a transfer overhead between the frame header and payload, and thus overheads in transmission bands can be reduced.

Figure 5:
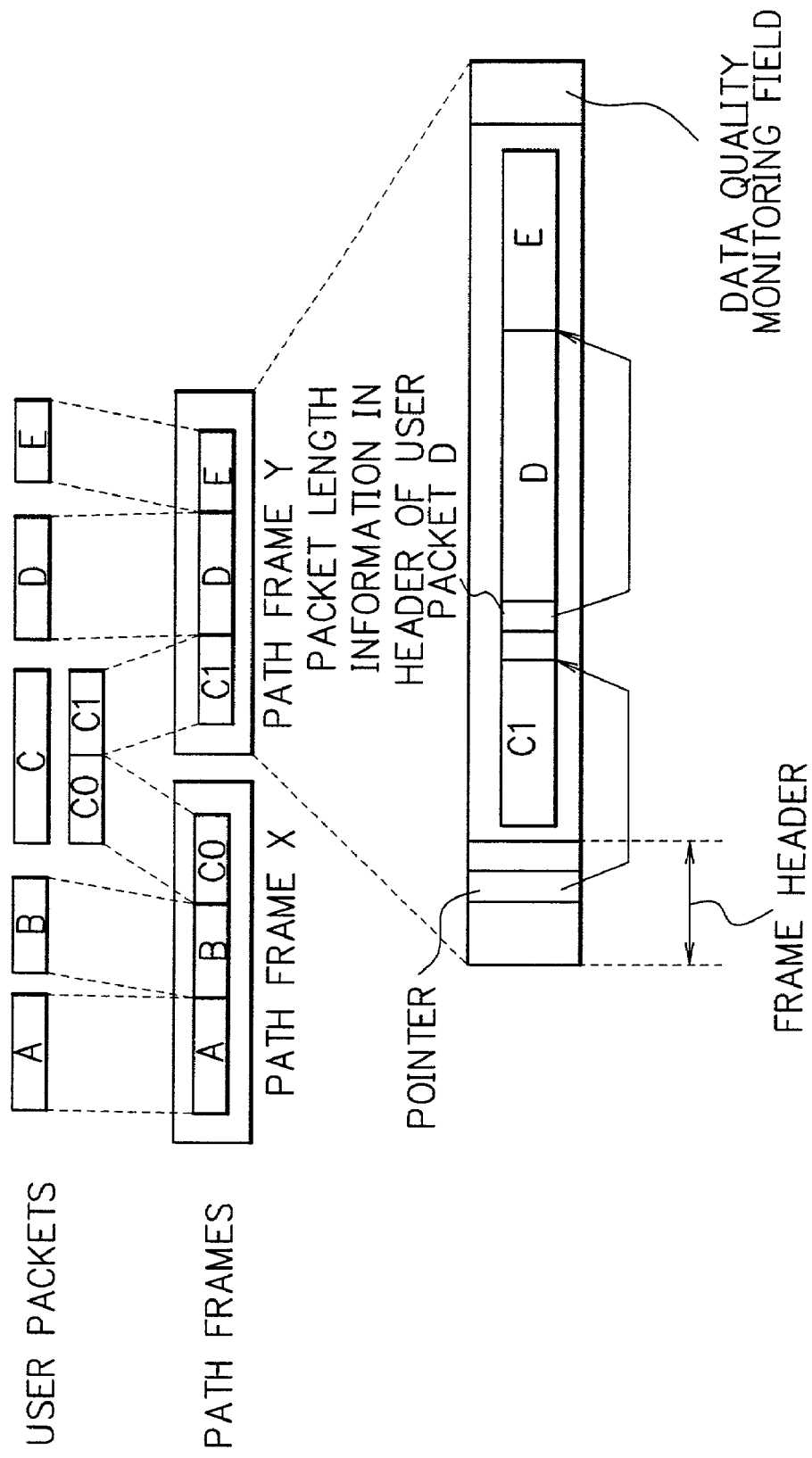
FIG. 5 is a schematic diagram explaining the mapping operation to distribute user packets to path frames according to an embodiment of the present invention.

FIG. 5 is an explanatory diagram showing operations for mapping user packets on path frames, and illustrates the way that the user data are stored in the data field of a path frame. As shown in FIG. 5, in which the user packets A, B, C, D and E are mapped on the data fields of the path frames X and Y, plural user packets are stored in a frame. Particularly, the user packet C is mapped on both path frames X and Y. Accordingly, the user packet C is divided into C0 and C1 to be transferred onto the frames X and Y.

Here, the pointer field is used to store information for restoring the path frames to user packets at the Egress. As is described above, the pointer value of the path frame is positional information indicating the position of the head of the first user packet in the data field, or the distance from the pointer field to the head of the first user packet in the data field.

For example, in the path frame Y of FIG. 5, the user packet D can be retrieved by the pointer. In addition, it is possible to recognize the data before the user packet D as the C1: data composing rear-end of the user packet C, and further, specify the head of the next user packet E using packet length information in the header of the user packet D. Thus it is made possible to restore the user packets from the data fields of the path frames sequentially. Incidentally, the different frame length and method of transferring path frames can be set for each path, which will be described later.

In the following, operations to form path frames at the input network device (Ingress) will be described. The IF card 10 of FIG. 2 includes individual buffers: FIFO (First In First Out) memories, for each path.

The network monitoring system etc. in the IF card 10 identifies a path number for each user packet of data inputted from user interfaces by registered information. Then only effective data are extracted, and written in individual buffers based on the path number. Taking a path accommodating ATM cells for instance, only effective ATM cells are written into a buffer, and idle cells, etc. are not written.

Similarly, as to IP packets and MPLS packets, only effective data are inputted in buffers. The frame forming section 13 reads path frames out of each buffer in the buffer section 11. Incidentally, the readout operation is performed according to the frame length defined for each path and transmission schedule defined for each path by the scheduling section 12.

Figure 6:
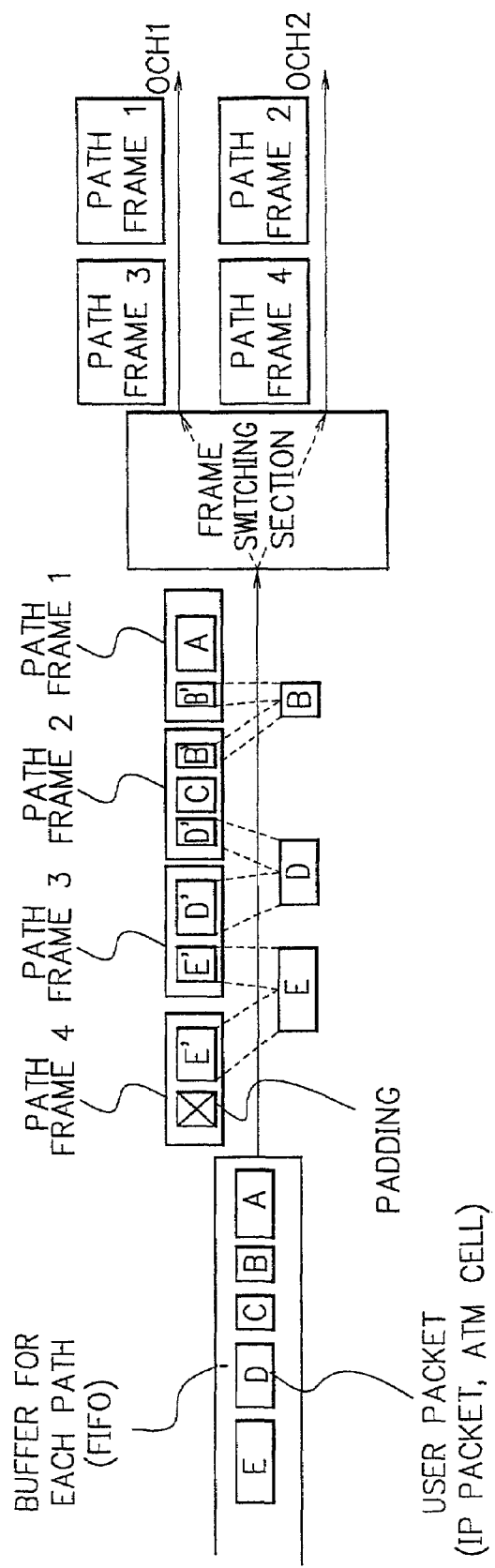
FIG. 6 is a schematic diagram showing an example of operations for transferring path frames to OCHs at a network device (Ingress) of the present invention.

Next, operations at the Ingress for transferring path frames to OCHs will be explained with reference to FIG. 6. Assuming a model concerning a path as shown in FIG. 6, user packets are written into FIFO: a buffer defined for each path. In this example, the packets A, B, C, D and E are written into a buffer (FIFO) of a certain path.

The path frames having a fixed frame length have been defined for each path beforehand, and the user packets are mapped on the path frames to be transferred sequentially. In the frame header of each path frame, a field for an ordinal number is defined. The ordinal number increases one by one with respect to each frame.

Besides, since the frame length of path frames is fixed, there can be the case where a user packet is mapped on plural frames when variable lengths user packets are mapped on path frames.

In the example of FIG. 6, the user packets B, D and E are distributed to the first and second frames, the second and third frames, and the third and fourth frames, respectively. The frame forming section 13 shown in FIG. 2 executes these operations for storing user packets and forming frames.

Timing for transferring a path frame is decided by judgment of the scheduling section 12 according to competitions with transfer timing of path frames on other paths. The frame forming section 13 always informs the scheduling section 12 of retention condition of buffers for respective paths in the buffer section 11, so that the scheduling section 12 can decide the frame transfer schedule.

As a frame transfer scheduling, for example, regarding to the path defined as CBR, path frames are read out in a fixed cycle. As to UBR, after adjusting transfer schedule among paths and selecting a path, path frames belonging to the path are read out of a buffer. Incidentally, when there is no data in buffers in the buffer section 11, frames are not to be formed.

In addition, even when data stored in a buffer are not enough to fill the capacity of a path frame, the data are read out as a path frame due to time out after a certain period of time has passed from the start of data accumulation in the buffer. On that occasion, the defined length of the path frame is preserved by padding the data field of the frame.

With the setting of time out for each path, it is made possible to keep the transfer delay of data flow in paths at the Ingress below the prescribed period of time.

As is explained above, according to the present invention, even when there is a little traffic of user data, a path frame is transferred after a time out period by padding the data field in the payload of the frame to hold the defined frame length. Besides, when there is no user traffic, frames are not to be formed. Therefore, it is made possible to keep the transfer delay in each path below the prescribed period of time, and besides define a minimum band for each path.

Moreover, since frames are not formed when there is no user traffic, invalid free space on an OCH is not to be made.

Paths are defined in between network devices (Ingress and Egress) as described above. Here, it is assumed that an Ingress and an Egress are connected by plural OCHs as shown in FIG. 1.

In order to define an arbitral transfer band as a path band, in the case where a communication line, on which paths are defined, consists of plural OCHs, the transmission of path frames is controlled so that the same numbers of frames are always transferred to respective OCHs. For example, when there are two OCHs (OCH1 and OCH2) of OC-48 (2.4 Gbps), either OCH1 or OCH2 is selected for each path frame to be transferred. In FIG. 6, the frames having odd ordinal numbers are transferred to the OCH1, and the frames having even ordinal numbers are transferred to the OCH2.

Figure 7:
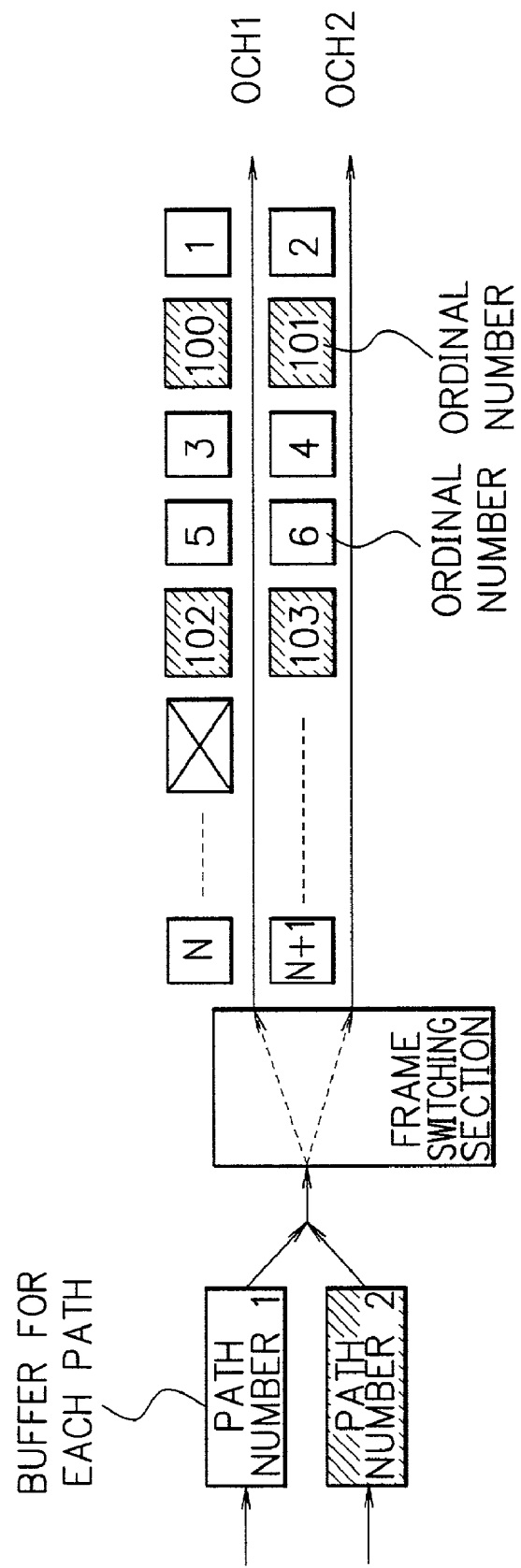
FIG. 7 is a schematic diagram showing another example of operations for transferring path frames to OCHs at a network device (Ingress) of the present invention.

In the case where plural paths share the same OCH, frames are distributed in the same way as above. FIG. 7 is a diagram explaining another example of operations for transferring path frames to plural OCHs at a network device (Ingress) of the present invention.

In FIG. 7, user traffic with the path number 1 and user traffic with the path number 2 are inputted to the Ingress. The shaded path frames stores the user packets having the path number 2, and the path frames without slash lines stores the user packets having the path number 1. As shown in FIG. 7, the frame length varies within respective paths.

The OCH1 or OCH2 is selected by turns to transfer the frames 1, 2, 3, 4, 5 and 6, which correspond to the path number 1. Similarly, the frames 100, 101, 102 and 103 corresponding to the path number 2 are distributed to the OCH1 and OCH2 alternately in sequence.

Figure 8:
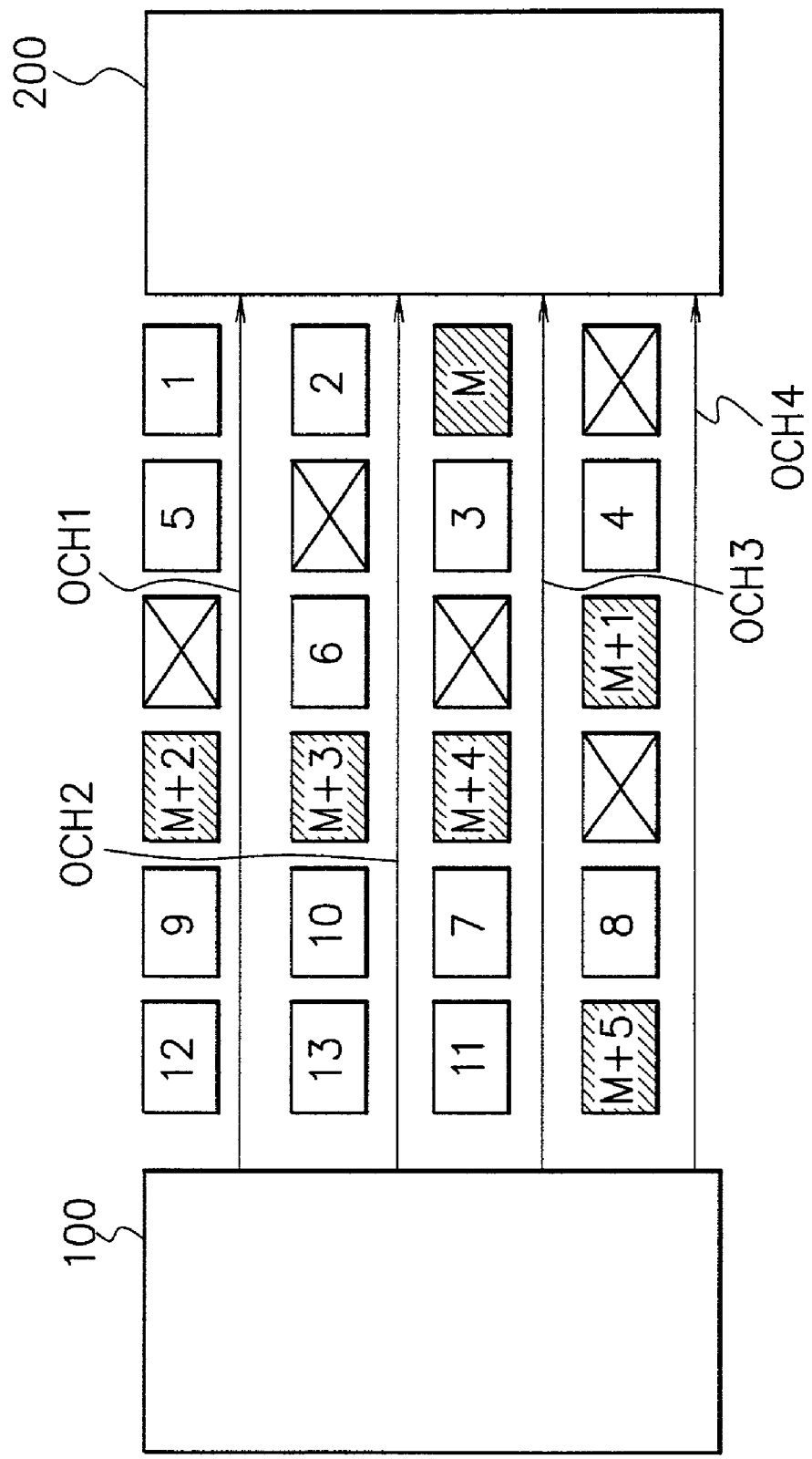
FIG. 8 is a schematic diagram showing an example of operations for transferring path frames between network devices via OCHs according to an embodiment of the present invention.

In the following, the case where four OCHs are defined to transfer path frames will be explained referring to FIG. 8. FIG. 8 is a diagram illustrating an example in which path frames are transferred between network devices via plural OCHs (OCH1, 2, 3 and 4) according to an embodiment of the present invention. The blank frames belong to the path 1, the shaded frames belong to the path 2, and the frames marked with a cross are free spaces.

The path frames numbered 1 to 13, which belong to the path 1, are distributed to one of the OCHs 1 to 4 selected by turns according to round robin scheduling.

Correspondingly, as to the frames belonging to the path 2, the frames numbered M to M+5 are distributed to one of the OCHs selected by turns according to round robin scheduling. Thus, the total number of path frames, and the number of each path's path frames on respective OCHs are matched. Besides, since the frame length set for each path is fixed, traffic is also equally distributed to respective OCHs.

Consequently, all paths that share the OCH1 and OCH2 transfer the same number of frames (the same volume of traffic) to each OCH, and traffic on the OCHs is equalized. Thus it is made possible to use plural OCHs equally for data transmission as a virtual link.

On the occasion of selecting one of OCHs by round robin scheduling, wherein a specified frame length is set for each logical path, a group of traffic having similar traffic characteristics may share the same OCHs so as to increase transfer efficiency of the OCHs. It may as well pad path frames regularly in advance, or set frame length dynamically to increase efficiency of data transmission.

As is described above, even in the case that there are plural paths in a virtual link, the length of path frames and transfer schedule can be defined on each path. Therefore, it is possible to accommodate various types of user traffic in a virtual link as well as satisfy transfer QOS: delay and CDV (Cell Delay Variation) etc., necessary for each user traffic by coordinating the transfer QOS with QOS of the paths.

Moreover, since frames are transferred only when user data are inputted, respective paths can secure just necessary volumes of traffic differently from the STM connection. Thus, it is made possible to realize statistical multiple-effect in the traffic on plural paths on the OCH.

Incidentally, as shown in FIG. 2, the IF card 10 includes the standby buffer 15 in preparation for retransmission of path frames, and stores the path frames, which are to be transferred to the frame switch by the frame forming section 13, in the standby buffer 15 for a certain period of time. In addition to the standby buffer 15, the IF card 10 is provided with the timer 16, and disposes of a path frame, which has stayed in the standby buffer 15 for a certain period of time, deciding that there is no retransmission request for the path frame. For example, at the network device (Ingress), the timer 16 clocks the time from when each path frame is transferred. Data of the transferred path frames are stored in the standby buffer 15 for a certain period of standby time, for instance, frame transfer delay×2+α. When receiving no control frame for requesting retransmission of a path frame during the standby time, the Ingress disposes of the path frame.

Figure 9:
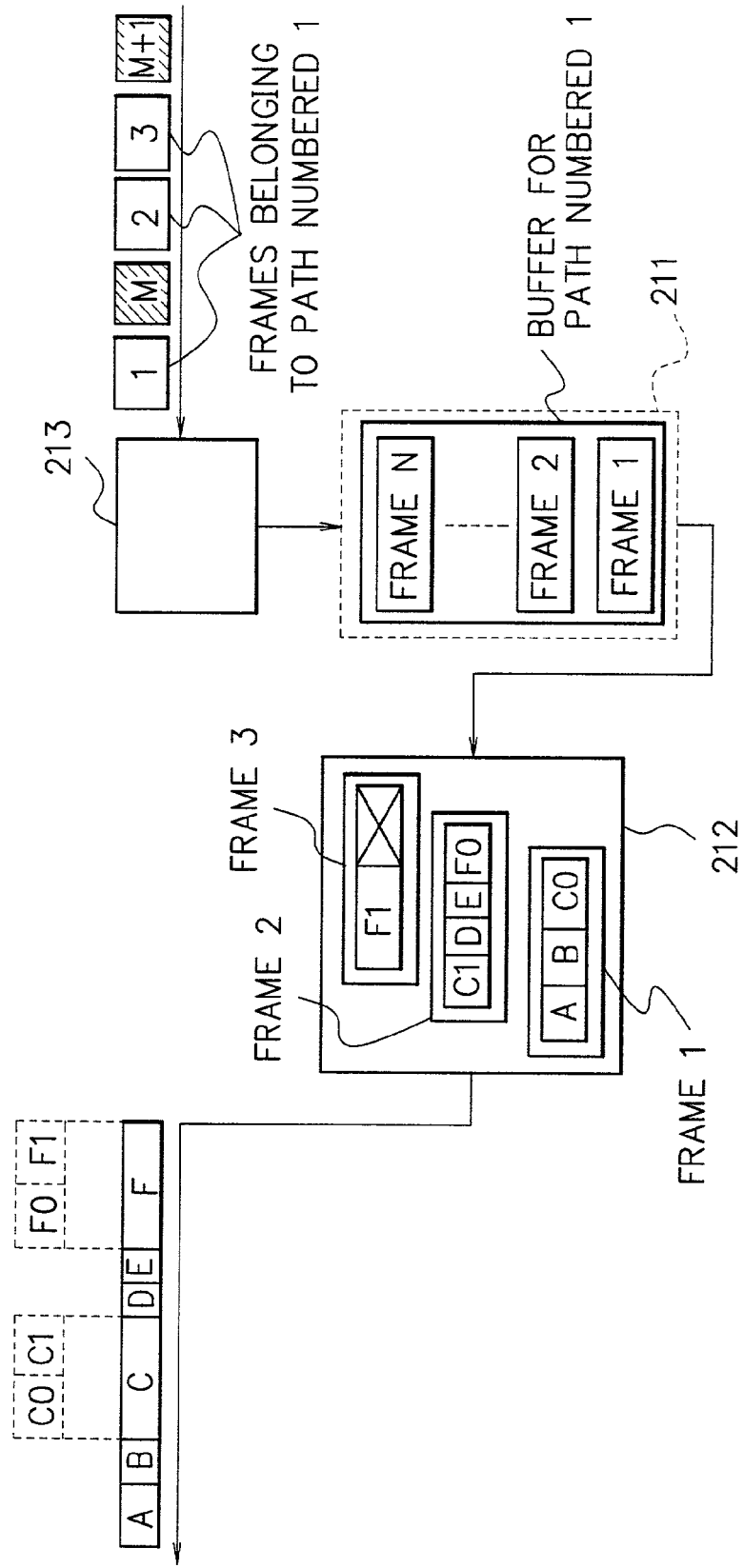
FIG. 9 is a schematic diagram showing operations for restoring user packets at a network device (Egress) of the present invention.

Restoration of frames is conducted at the network device (Egress) 58. In the buffer section 211, paths have their individual buffers. FIG. 9 is a diagram explaining operations for restoring user packets at a network device (Egress) of the present invention, and showing a configuration in the buffer.

First, the path frames having transferred on OCHs are sent to the frame restoring section 213 on the IF card 210 shown in FIG. 3. After having examined a frame header of each path frame and propriety of data, the frame restoring section 213 writes path frames into their individual buffers in the buffer section 211. The path frames are stored in the buffers according to the ordinal number as shown in FIG. 9.

In the frame forming section 13 at the Ingress, data corresponding to each path are stored in the buffer section 11 (FIFO), then path frames, each of which is given an ordinal number in ascending order, are set up, and the path frames are distributed to OCHs by round robin scheduling. Accordingly, it is necessary to deal with the path frames, and retrieve the data from the path frames based on the ordinal number, in restoring user packets as well.

However, path frames does not always arrive at the frame restoring section 213 according to their ordinal numbers due to transmission delay on each OCH, or conditions of the frame forming section 13 and frame switching section 20 at the Ingress.

Therefore, the frames are once retained in the buffer section 11, and the readout operation is controlled so that the frames are read into the packet restoring section 212 as to their ordinal numbers, even when reverse rotation occurs in ascending order of the frames. Namely, when the frame with the ordinal number "M" has been read out of the frame restoring section 213 into the packet restoring section 212, it is necessary to wait for the arrival of the frame "M+1" and read it next. In the example of FIG. 9, frames 1, 2 and 3 are read into the packet restoring section 212 sequentially.

On the other hand, the maximal value of delay time or CVD in path frame transfer from the Ingress to the Egress is predictable, and therefore the maximum interval of incoming frames can be calculated previously. In the case that the path frame "M" has not arrived, even as the path frame "M+1" has already arrived; the arrival of the frame "M" is waited for a period of the maximum interval, and when the frame "M" does not arrive during the period, it is judged that the frame "M" has been discarded on the network.

The timer 215, accompanying the frame restoring section 213 at the Egress, clocks a period of an interval between incoming frames, and informs the frame reforming section 213 of time-out of a frame, which has not arrived after the maximum interval period has passed. Thereby the frame restoring section 213 decides that the frame has been lost on the network.

The packet restoring section 212 retrieves the first user packet from a data field using a pointer in a frame header, then identifies the position of the head of the next packet based on packet length information in the header of the user packet, and thus retrieves a new packet.

When a packet is divided and distributed to plural frames, the divided packets in the plural frames are reassembled to retrieve the original packet. Having retrieved user packets, the packet restoring section 212 transfers the packets to user interfaces, respectively.

Next, operations according to an embodiment of the present invention in the case where errors occur in path frames transferred on OCHs will be explained.

In data transmission from a network device (Ingress) to another network device (Egress), there are cases that path frames are not received normally due to an error(s) in data in a frame, or the loss of a frame(s) at a frame switch.

Here, control operations in the case that an error occurs in a frame itself will be described. As the control operations, the following embodiments E1 and E2 are conceivable. An operator using the network device can select either E1 or E2.

The embodiment E1, by which only disposal of a frame is performed, will be described first. Frame errors are detected by checking frame headers and data fields at the frame restoring section 213 of the Egress. On this occasion, when there is a frame containing a frame error, the erroneous frame is immediately disposed of. Besides, packets included in the discarded frame are also immediately discarded at the packet restoring section 212. In FIG. 9, for example, when the frame 2 is discarded, the packets C, D, E and F are also discarded.

In the embodiment E2, retransmission of the frame is conducted after the disposal of the erroneous frame. In the following, operations for discarding and retransmitting a frame will be described. When a frame error occurs in a data field, the path number and ordinal number of a lost path frame can be identified, and therefore, information of the path number and ordinal number is supplied to the retransmission control section 214.

When a frame error occurs in a frame header, it is impossible to identify the path number and ordinal number of a lost path frame on disposal of the erroneous frame. However, the frame restoring section 213 can identify the path number and ordinal number of the path frame, which the frame restoring section 213 has not received when a certain period of time has passed, by time information from the timer 215, and inform the retransmission control section 214 of the path number and ordinal number. Thus the retransmission control section 214 transmits the path number and ordinal number by a control frame to the Ingress 100.

The retransmission control process proceeds as follows. First, the frame restoring section in the IF card detects an error in the frame header or data field of a received path frame (Step 1).

The frame restoring section informs the retransmission control section of the path number and ordinal number of the path frame, in which a data field error occurs (Step 2).

Similarly, the frame restoring section informs the retransmission control section of the path number and ordinal number of the path frame, which has not been received when a certain period of time has passed, by the instruction from the timer (Step 3).

The retransmission control section sends the path number and ordinal number to the Ingress by a control frame (Step 4).

On the other hand, the frame restoring section and the packet restoring section discard the user data, or user packet, which have been transferred by the erroneous frame (Step 5).

The frame restoring section suspends restoration of the user data, or user packet, by queuing path frames ordered after the erroneous frame in the buffer section until the erroneous frame is retransmitted (Step 6).

The retransmission control section in the IF card at the Ingress receives the control frame, reads a path frame corresponding to the path number and ordinal number out of the standby buffer, and resends the path frame to the Egress (Step 7).

Incidentally, The Ingress 100 stores all path frames transferred from the frame forming section 13 to the frame switch in the standby buffer 15 for a certain period of time in preparation for retransmission. The timer 16 informs the Ingress 100 of time information so that the Ingress 100 recognizes a path frame that has stayed in the buffer 15 for a certain period of time. Accordingly, the Ingress 100 decides that retransmission concerning the path frame is not to be directed, and disposes of the path frame from the standby buffer 15.

After the path frame is retransmitted from the Ingress to the Egress, restoration of user data, or user packets, restarts from the retransmitted path frame (Step 7).

Figure 10:
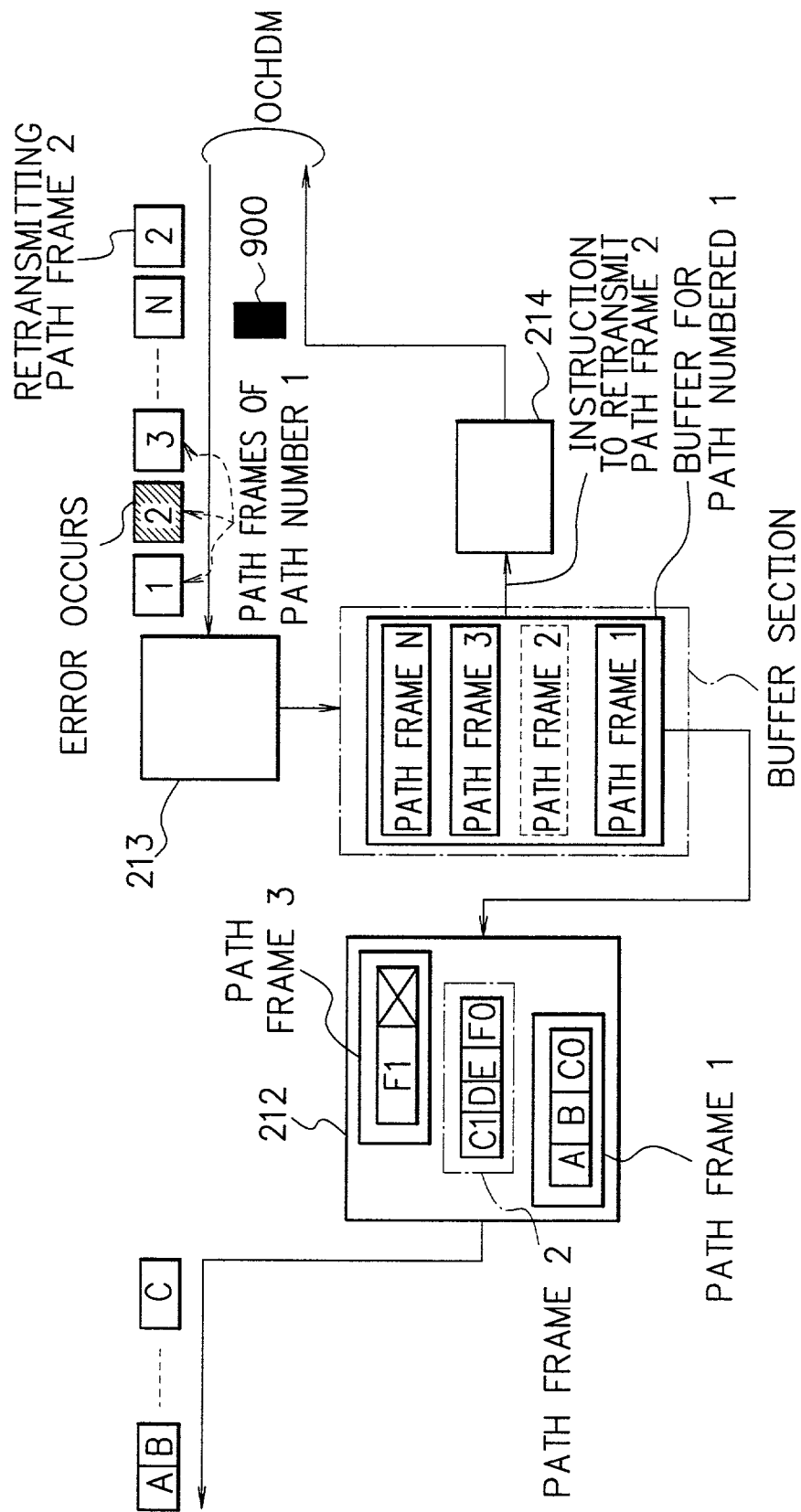
FIG. 10 is a schematic diagram showing operations for retransmitting path frames at a network device (Egress) of the present invention.
Figure 11:
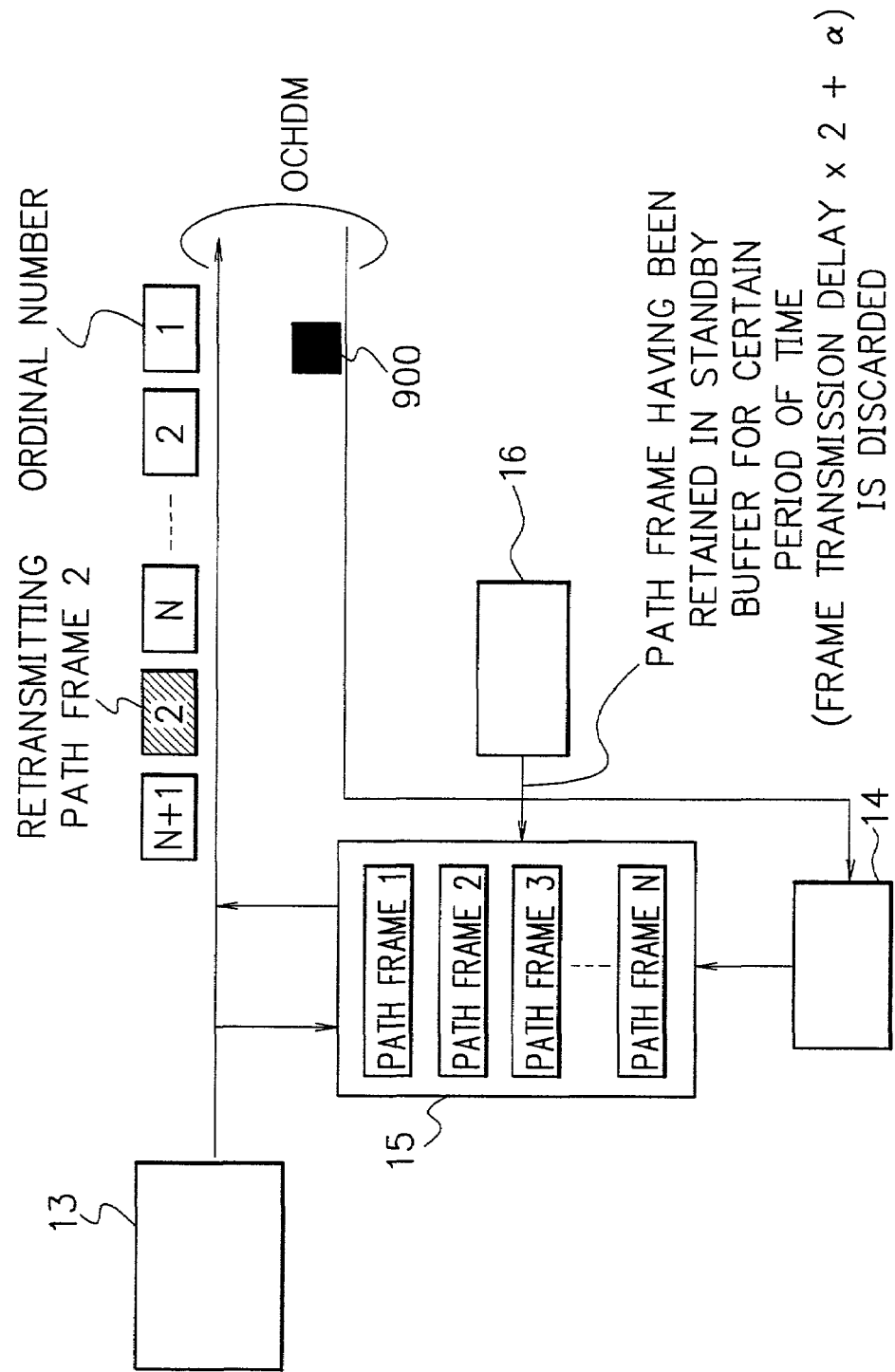
FIG. 11 is a schematic diagram showing operations for retransmitting path frames at a network device (Ingress) of the present invention.

Next, description of processes for disposal and retransmission of a frame will be given in detail referring to FIGS. 10 and 11. FIG. 10 is a diagram illustrating operations for retransmission of a path frame at a network device (Egress). FIG. 11 is a diagram illustrating operations for retransmission of a path frame at a network device (Ingress).

The frame restoring section 213 at the Egress detects a frame error by checking the frame header or data field of a received path frame. When the frame restoring section 213 finds an erroneous frame, the erroneous frame is discarded immediately. Besides, at the packet restoring section 212, packets that are contained in the erroneous frame are discarded immediately. In the example of FIG. 9, when the frame 2 is discarded, the packets C, D, E and F are also disposed of.

In the case that the error occurs in the data field, and no error is found in the frame header, the Egress informs the retransmission control section 214 of the path number and ordinal number of the erroneous frame to have the Ingress resend the frame.

In FIG. 10, the frame restoring section 213 detects the loss of the frame having the ordinal number 2 and path number 1, and informs the retransmission control section 214 of the ordinal number 2 and path number 1. The retransmission control section 214 informs the Ingress of the numbers by transmitting a control frame 900. At the packet restoring section 212, the packets A and B, which are contained in the frame numbered 1, are restored and transferred. As to packet C, which has been divided and transferred by path frames 1 and 2, the restoration cannot be conducted until the path frame 2 is retransmitted. Thereby, transmission of packets subsequent to the packet C is suspended until the path frame 2 arrives.

On the other hand, the retransmission control section 14 at the Ingress receives the control frame 900 as shown in FIG. 11. The retransmission control section 14 reads a path frame in question out of the standby buffer 15, and resends it. The retransmission operation is performed by the control between the frame forming section 13 and the scheduling section 12.

The retransmitted path frame is transferred to the frame restoring section 213 at the Egress, and then transferred to the buffer section 211 to make up for the discarded frame. Thus, in the packet restoring section 212, the path frame is restored to a user packet. In the example of FIG. 10, packet transmission after the packet C restarts on arrival of the path frame 2.

As is described above, the Egress includes a means for specifying information of discarded path frames, and the Ingress 100 includes a means for holding path frames for a certain period of time in preparation for retransmission. Thereby, even if the loss of a pass frame occurs due to a data error on communication channels, or congestion at the frame switch of network devices (Ingress/Egress), the Egress informs the Ingress of information of the lost path frame, and the Ingress retransmits the path frame to the Egress. Thus, it is possible to avoid the loss of user data, or data in user packets.

Figure 12:
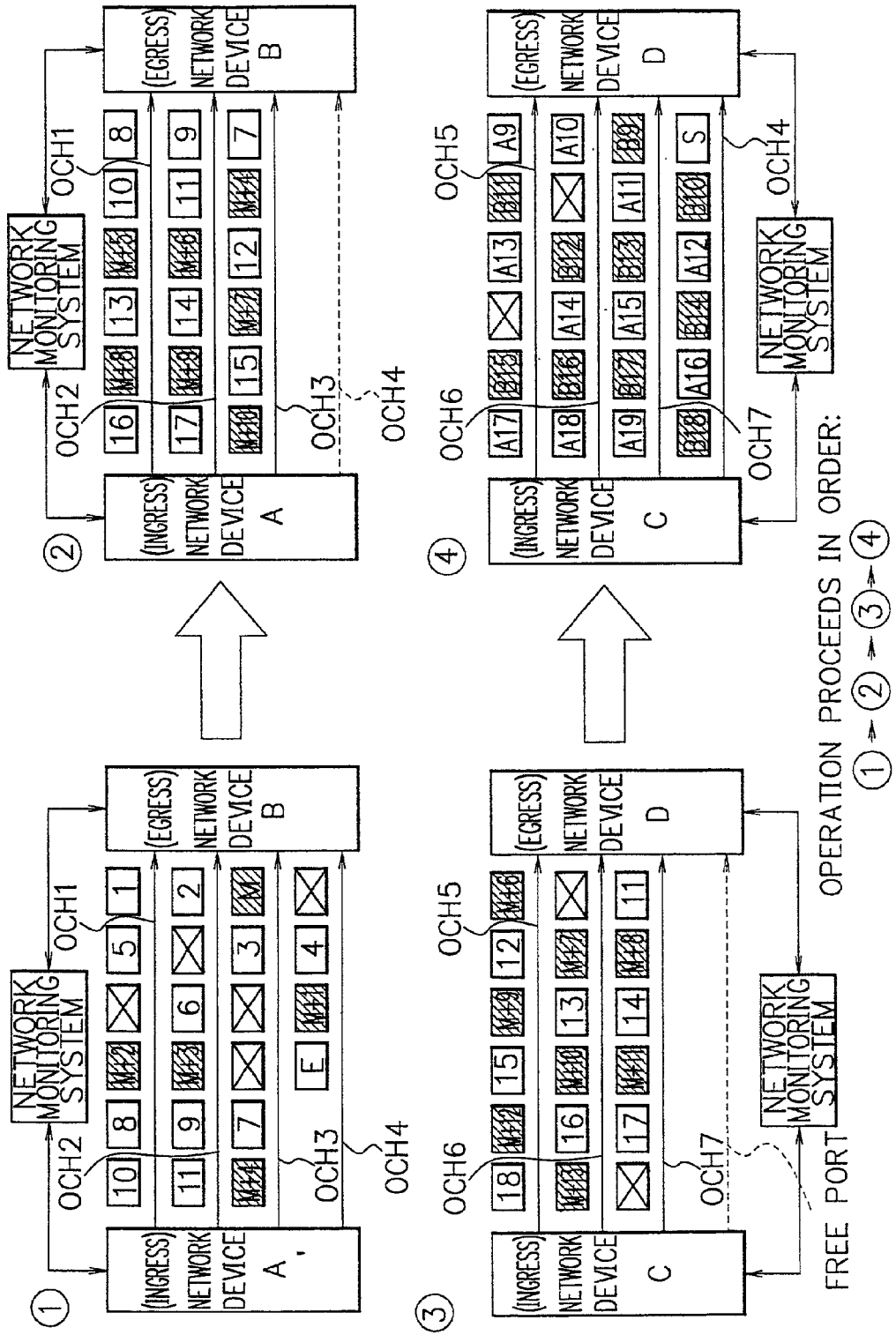
FIG. 12 is a schematic diagram showing operations for connecting/disconnecting an OCH connection, and for transferring path frames according to an embodiment of the present invention.

FIG. 12 is a diagram showing another embodiment of the present invention, which illustrates an example of operations for connecting/disconnecting an OCH, and transferring path frames. In this embodiment, a start frame (the frame denoted by S in FIG. 12) and an end frame (the frame denoted by E) are newly defined as control frames.

The start frame is a control frame for indicating initiation of data transmission on a new OCH set between network devices. The end frame is a control frame for indicating termination of data transmission on an existing OCH that is to be removed from between network devices.

In the example of FIG. 12, OCHs 1 to 4 connect network devices A and B (①). On the other hand, OCHs 5 to 7 connect network devices C and D (③). Here, a connection by the OCH 4 is cut off according to decrease in the required capacity for data transmission between the network devices A and B, and the transmission is continued on the OCHs 1 to 3 only (②). Besides, a connection of the OCH 4 is added to connections of the OCHs 5 to 7 according to increase in the data traffic between the network devices C and D (④).

If it is assumed that the network devices A, B, C and D are connected in the same link, the above situation corresponds to a switch in the usage of the OCH 4. This embodiment is shown in FIG. 13, which illustrates an example of operations for switching the OCH 4 in a one-way ring.

Figure 13:
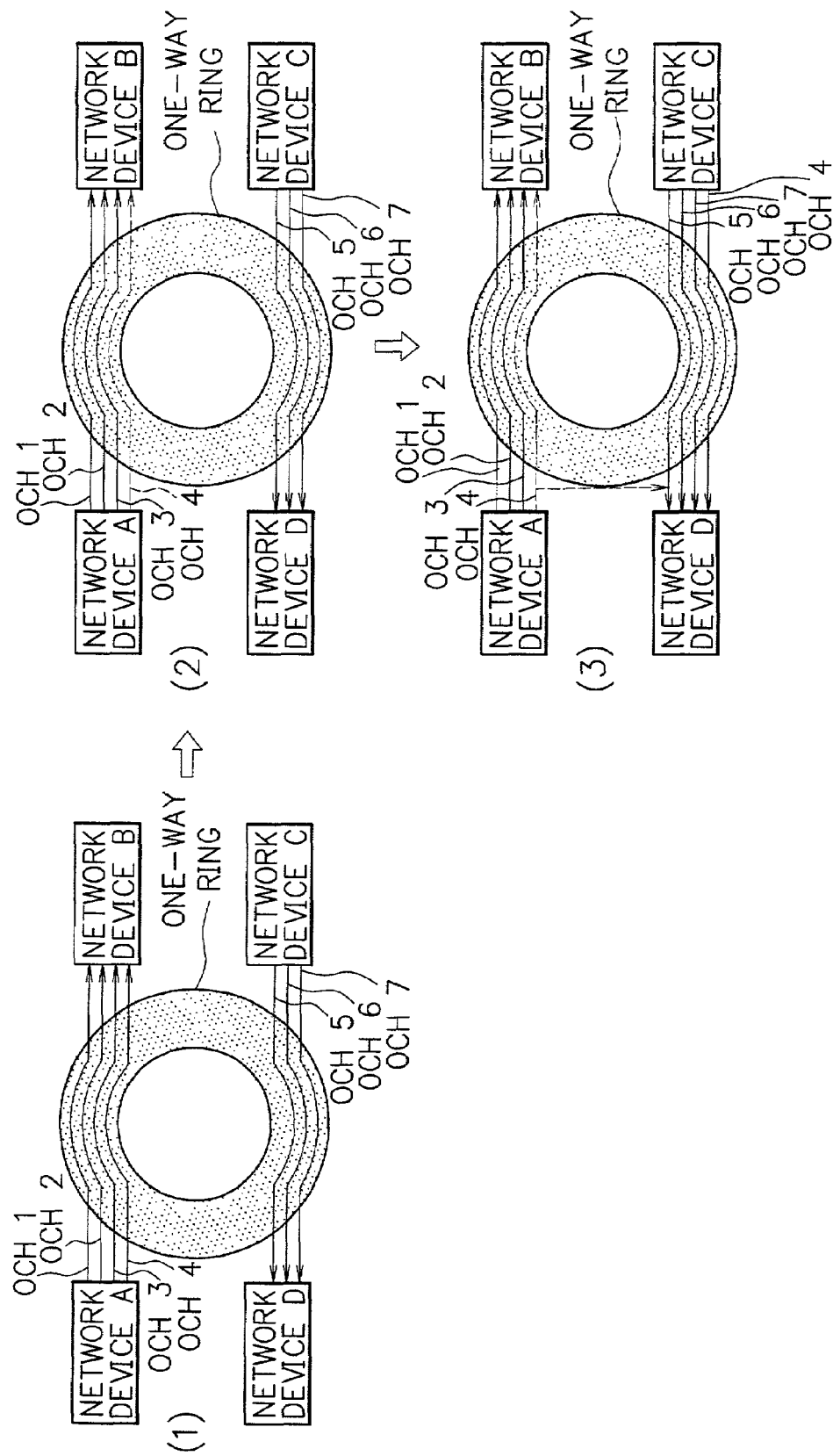
FIG. 13 is a diagram showing operations for switching OCHs on a one-way ring according to an embodiment of the present invention.

Even in the case as shown in FIG. 13, it is possible to correspond to the topology of OCH connection flexibly by means of setting path frames for each path as a transfer unit.

First, the network devices A and B decide to disconnect the OCH 4 through a network monitoring system. On that occasion, it is necessary to gear the disconnection of the OCH with data transmission, because a large volumes of data will be lost if instantaneous disconnection occurs in data transmission. Consequently, the network device A controls frames so as to be transferred to the OCHs 1 to 3 only before cutting off the OCH 4. On the other hand, the network device A adds an end frame to the end of data to be transferred to the OCH 4.

Having received the end frame on the OCH 4, the network device B decides that there is no data to be transferred via the OCH 4 from the network device A, and informs the network monitoring system of that the OCH 4 is disused. The network monitoring system instructs the network devices A and B to release the use of a wavelength for the OCH 4. Accordingly, the network devices cut off the connection of the OCH 4 at the level of wavelength layers.

After that, the network monitoring system instructs the network devices C and D to make a connection by the OCH 4 at the wavelength layers. Thereby, the network device C outputs an optical signal having a wavelength corresponding to the OCH 4 at the wavelength layers.

In the case where the network device D securely receives the optical signal corresponding to the OCH 4, the network device D informs the network monitoring system of the reception.

In addition, the network monitoring system instructs the network devices C and D to transfer data frames. The network device C inserts a start frame indicating initiation of data transmission into the forefront of the data frames. Having received the start frame, the network device D informs the network monitoring system of the reception. Thus, the connection for data transmission between the network devices C and D by OCH 4 is established.

In the above embodiment, the number of OCHs between the network devices A and B, and also C and D changes from 4 to 3, and 3 to 4 respectively. The network devices A, B, C and D are always conscious of OCHs in use, and transfer path frames belonging to each path to only active OCHs in order by round robin scheduling. Thus, it is made possible to switch OCH connections without the loss of data frames.

As is described above, according to the present invention, in the case where the number of OCHs between transport devices changes due to connection/disconnection of OCHs, frames are transferred to only active OCHs based on ordinal numbers. Besides, a start frame and an end frame are defined as control frames along with connection/disconnection of each OCH. Accordingly, it is possible to maintain data transmission in conjunction with wavelength layers in a dynamic wavelength connection/disconnection realized by advance in technology for optical devices.

In the example of FIG. 12, an OCH is connected/disconnected systematically by inter-work between the network monitoring system and each network device. Besides, as another embodiment of the present invention, in the case where a sudden disconnection of an OCH occurs due to a failure etc. differently from the example of FIG. 12, it is possible to switch OCH connections so as to stop transferring data to the disconnected OCH and include a spare OCH instead.

Figure 14:
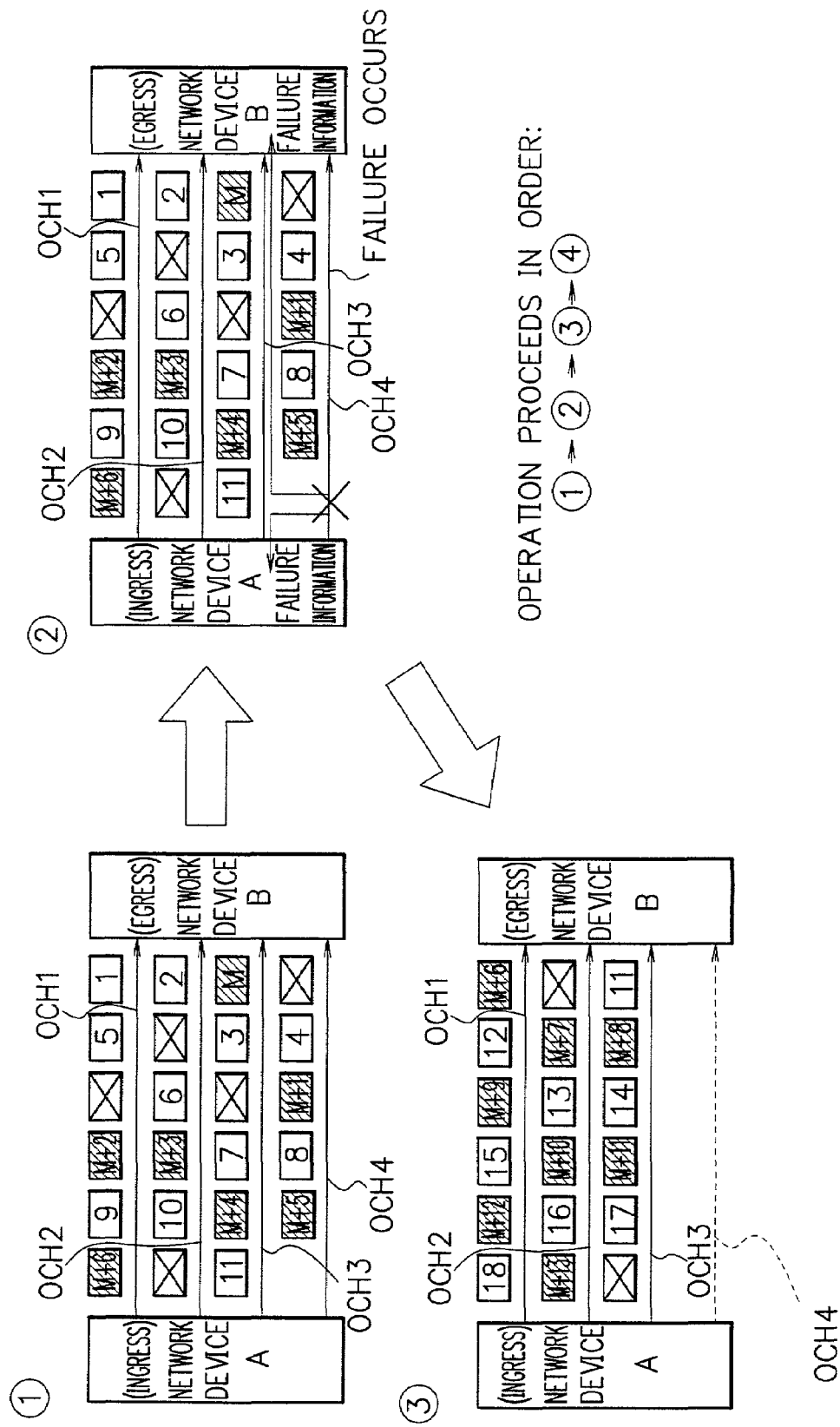
FIG. 14 is a schematic diagram explaining the switching operation when an OCH error occurs according to an embodiment of the present invention.

FIG. 14 is a diagram illustrating the switching operations at a point of failure on an OCH according to the embodiment. In the example of FIG. 14, four OCHs connect the network devices A and B. In such condition, assuming that a failure occurs in the OCH 4, and the OCH 4 is not to be used for data transmission, the network devices A (Ingress) and B (Egress) are immediately informed about the failure at a wavelength layer for the OCH 4. Incidentally, there are several known methods for informing the network devices, and the detailed description is omitted here. Then, the Ingress A decides that the OCH 4 is out of use, and performs subsequent data transmission using only three OCHs: the OCHs 1, 2 and 3.

In a frame transfer system according to the present invention, path frames are distributed to active OCHs by round robin scheduling. Consequently, even when a virtual link composed of four OCHs changes to one composed of three OCHs due to a failure, data transmission can be maintained without a hindrance, apart from the temporary loss of a path frame(s) at a point of failure.

However, if the user traffic between the network devices A and B requires more than three channels, data transmission may not be maintained. However, in many cases, OCHs are used at below a half of average rate of usage in general data communication, and according to the present invention, it is made possible to restart data transmission promptly without preparing a new OCH for Protection. Moreover, even if the required bands between the network devices A and B exceed the bands of three channels, it is possible to perform flexible operations, such as protecting higher priority user traffic, by transferring only path frames that belong to higher priority paths to three active OCHs.

In accordance with the present invention, when errors occur in OCHs, and the OCHs cannot be used for data transmission, the erroneous OCHs are specified by notice from lower layers. Then, the whole of available active OCHs is immediately considered as a new virtual link, and data transmission can be continued. Therefore, if the volume of user data is a little less than the capacity of the active OCHs, it is possible to continue data transmission easily without spare protection wavelength. Furthermore, even if the volume of user data is larger than the capacity of the whole active OCHs, higher priority traffic is extracted from user data traffic and transferred to the active OCHs. Thus, flexible priority control, such as protecting higher priority user traffic and continuing service, can be realized.

In accordance with the present invention, a path is defined for each traffic to be transferred, and a frame length as well as transmission schedule of path frames are set for each path. Therefore, it is possible to deal with various types of traffic. For example, in the case of transmitting STM signals, path frames having a fixed frame length are sent at a regular interval.

Figure 15:
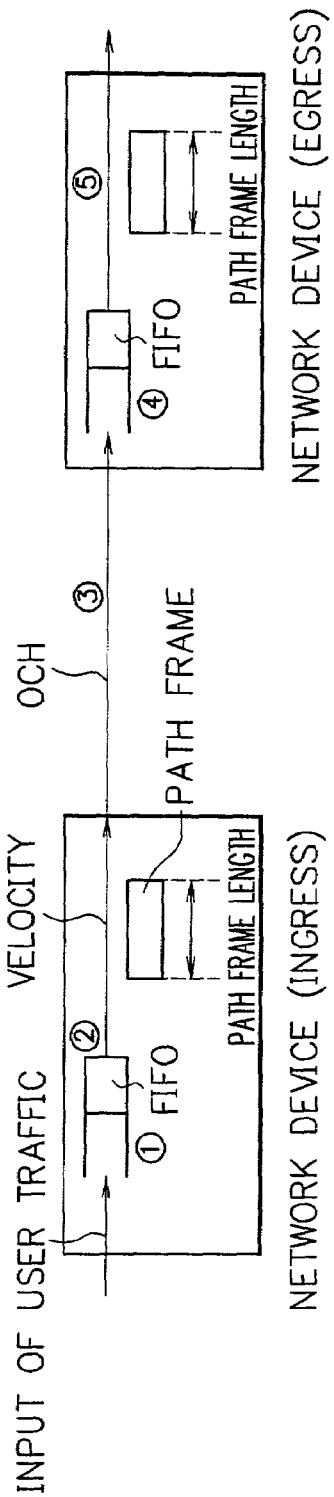
FIG. 15 is the example definition of path frame length and transfer cycle according to an embodiment of the present invention.

Moreover, in the transmission of traffic that is critical of delay, delay can be reduced by setting the path frame length shorter, since most of delay occurs at the time of forming path frames, Furthermore, as to traffic having high burst tendency, effective transmission can be realized by setting the path frame length as long as burst length so that generation of user traffic is synchronized with construction of path frames. This application example is shown in FIG. 15. In FIG. 15, standards of frame lengths and transmission cycles of path frames are described according to the parameter of FIG. 15.

FIG. 15 shows an example of provisions for the frame length and transmission cycle of path frames according to an embodiment of the present invention. In this embodiment, an example of operations for setting path frames, when end-to-end delay is defined as a request from a user, will be explained. Here, the end-to-end delay is a period from when user traffic is inputted to a network device (ingress) to when the user traffic is outputted from another network device (Egress). The required delay is denoted by T. In addition, a required band is the average band for user data transmission. For example, in the case of transmitting voice data, the band may be defined as 64 kbps.

OCHs are a communication link between the Ingress and Egress. A plurality of user traffic is multiplexed and transferred onto the OCHs. For example, OC-48 (2.4 Gbps) may be defined as the OCH. Considering that in what manner user data is transferred from the Ingress to the Egress, it is possible to estimate factors of delay generated in the end-to-end. In the following, each factor of delay will be explained for respective points ① to ⑤ in FIG. 15.

① . First, user data is inputted to the Ingress, and stored in the FIFO until the data accumulates enough to fill the fixed frame length of a path frame. The period taken for the accumulation is the first factor of delay.

② . Next, a period of time to read the user data, which has accumulated to the frame length, into a communication channel as a path frame is the second factor of delay.

③ . The read path frame is transferred via an optical fiber to the Egress as an optical signal. The third factor is the propagation time of the optical signal, which is in proportion to the length of the optical fiber. In FIG. 15, this is defined as τ.

④ . Then, at the Egress, in order to restore the path frame transferred on the communication channel to user data, the path frame is once stored in the FIFO for a certain period of time. This is the fourth factor of delay.

⑤ . Finally, a period of time to read the user data out of the FIFO is the fifth factor of delay.

Thus, the delay T can be expressed as follows:

$$T > ① + ② + ③ + ④ + ⑤$$

The generating points of delay ① , ② , ③ , ④ and ⑤ , and the contents are shown in FIG. 15.

Assuming that: a required band=average velocity of user data=V=64 kbps, end-to-end required delay time=T=50 msec, velocity of OCH=R=2.4 Gbps, transfer time on an OCH=τ=20 msec; the above expression of constraint comes to:

50 msec>20 msec+2×path frame length×(1/64 k+1/2.4 G); and thus:

960 bits (120 byte)>path frame length.

Namely, according to the present invention, when the path frame length is set to 120 byte, user traffic of 64 kbps is transferred with the maximum delay time of 50 msec. Incidentally, to be precise, in the case where an operation for reading out user traffic overlaps with another readout operation at the points ② : path frames of user traffic are read out at the Ingress, and ⑤ : path frames of user traffic are read out at the Egress, there can be further delay in transmission of the user traffic. If the user traffic has the highest-delay priority, such delay does not occur. The example shown in FIG. 15 is intended for the user traffic with the highest-delay priority.

As is described above, it is possible to realize QOS on the network required for user traffic by setting a length of path frames according to requirements such as the velocity of the user traffic and the end-to-end delay time.

Figure 16:
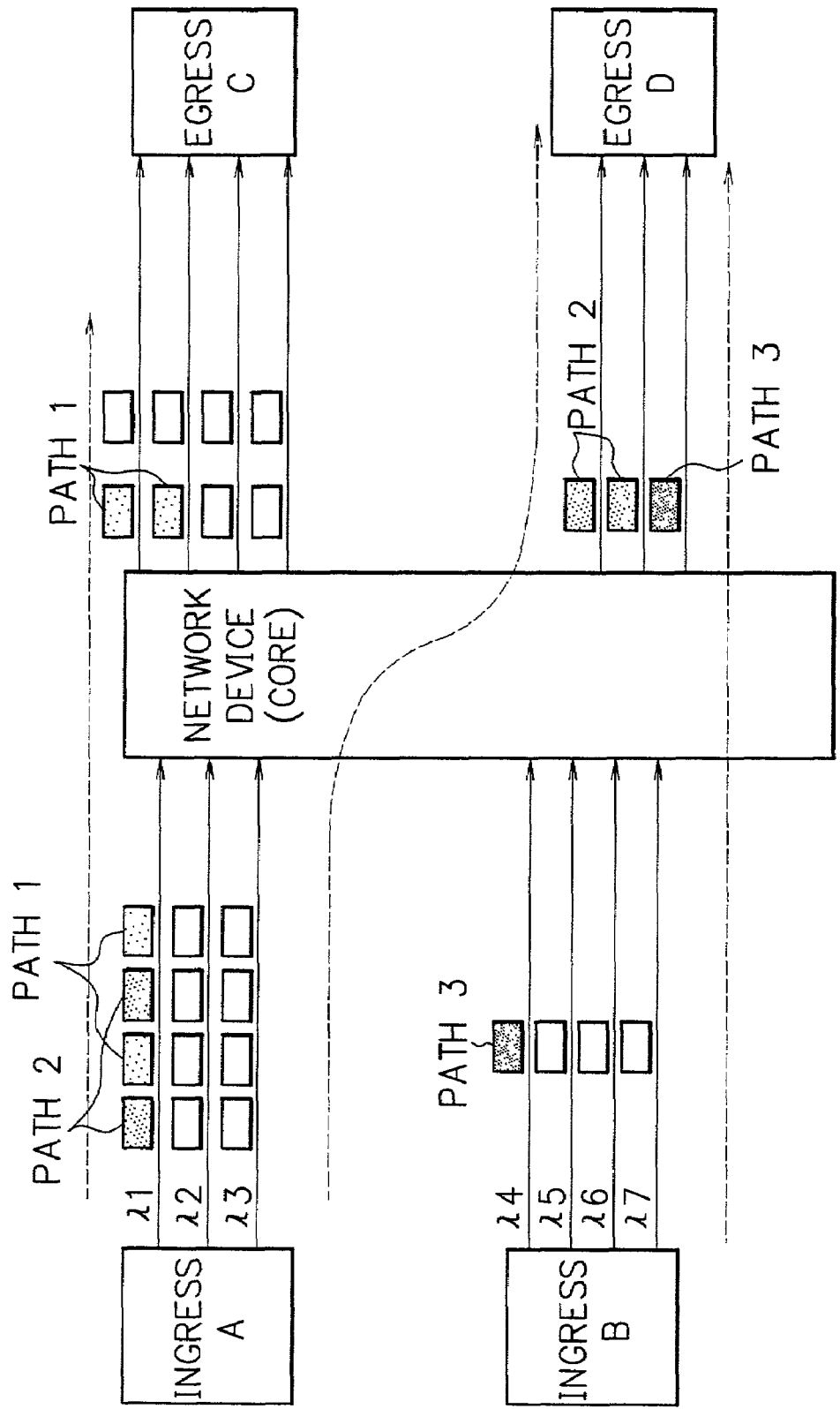
FIG. 16 is a schematic diagram showing a transfer concept at a network device (CORE) according to an embodiment of the present invention.

Operations for path frame transfer between network devices (Ingress/Egress) have been described above. In the following, transfer operations at a network device (CORE), which acts as an intermediary device on the network, will be explained. FIG. 16 is a diagram illustrating operations for path frame transfer at a network device (CORE) according to an embodiment of the present invention. Having received path frames corresponding to the path 1 and path 2 from the Ingress, the CORE switches OCH output ports, and outputs the path frames referring to the path number of each frame.

Figure 17:
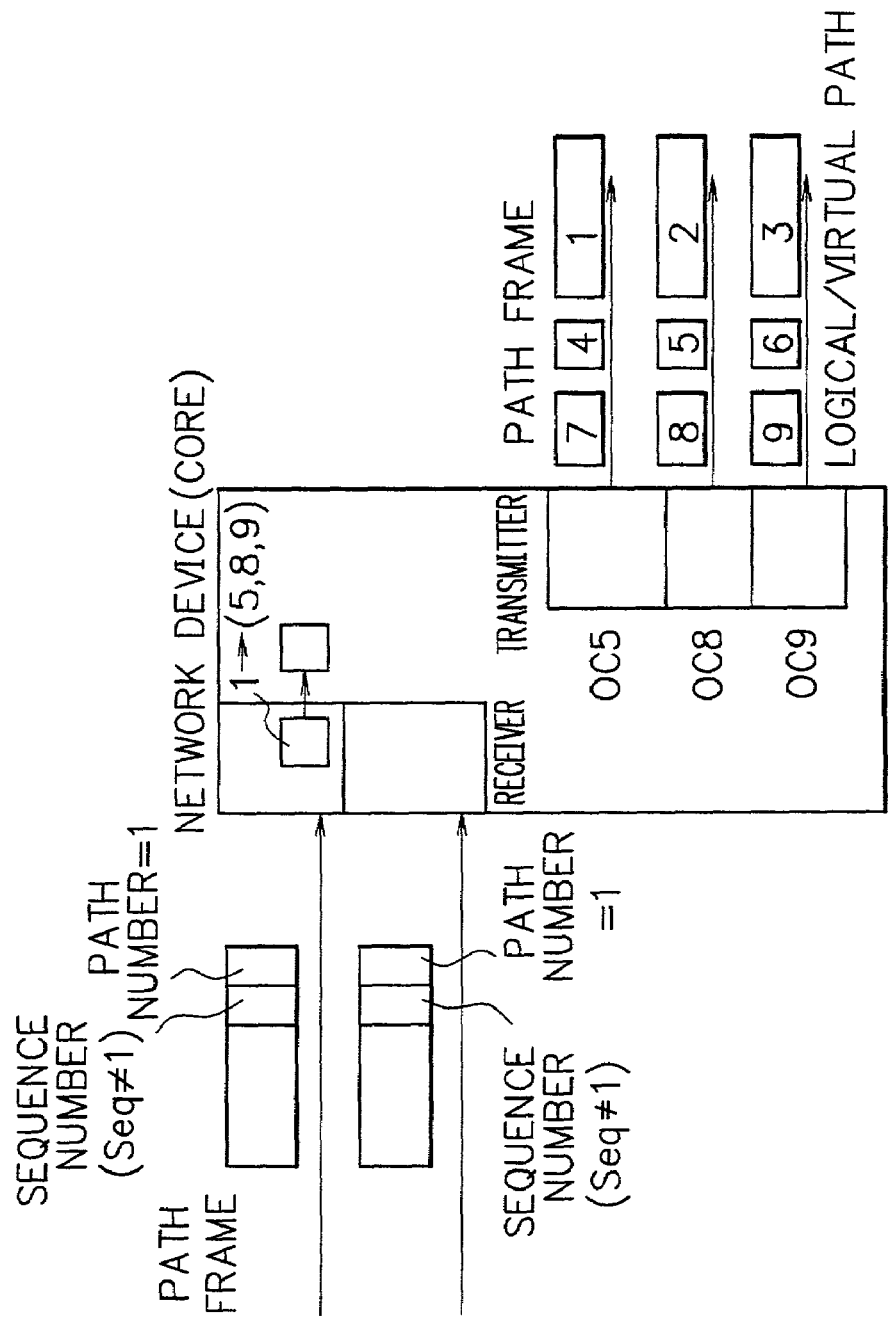
FIG. 17 is a schematic diagram showing the transfer operation at a network device (CORE) according to an embodiment of the present invention.

FIG. 17 is a diagram illustrating transfer operations at a network device (CORE) according to an embodiment of the present invention.

Having received a path frame, the CORE decides one of output channels referring to destination information set for the path in advance, and transmits the path frame from a transmitter.

For example, when the CORE receives path frames belonging to the path 1, which have been set so as to be outputted to OCH 5, OCH 8 and OCH 9 at a transmitter, via the OCH 1 and OCH 2, the CORE selects the OCH 5, 8 or 9 by round robin scheduling for each path frame, and transfers the path frames sequentially.

As set forth hereinabove, according to the present invention, a path is defined for each traffic of user data transferred between network devices based on QOS necessary for the traffic. On the path, path frames, each of which is given an ordinal number, are formed corresponding to inflow of the user data. The length and transfer schedule of the path frames are defined for each path. The path frames are transferred to plural OCHs sequentially by round robin scheduling and the user data are transferred by the path frames having a fixed frame length. Thereby, it is made possible to utilize plural OCHs as a virtual link, and thus a user can use any band necessary for transferring data regardless of constraints such as the number of OCHs or the transfer rate of OCHs.

While the preferred embodiments of the present invention has been described using specific terms, such description is for illustrative purposes only, and it is to be understood that changes and variations may be made without departing from the spirit or the scope of the following claims.

What is claimed is:

1. A frame transfer device, which is connected to another frame transfer device by plural physical channels, comprising:

a means for maintaining logical paths which vary with user traffic and priority of the user traffic; and a means for forming path frames having a fixed frame length and transfer schedule with respect to each path to transfer the user traffic, wherein a header part of each path frame comprises i) a field for storing a path number to identify the logical path, ii) a field for storing an ordinal number attached to the path frame at the time of forming the frame, and iii) a pointer field indicating positional information of the first user packet, which first user packet is stored in a payload part of the path frame.

2. A frame transfer device as claimed in claim 1, wherein the physical channels are optical channels that are defined by wavelengths.

3. A frame transfer device as claimed in claim 2, wherein m logical paths are used in correspondence with n physical channels, m and n are integers greater than 1.

4. A frame transfer device as claimed in claim 3, further comprising a frame forming processor for selecting channels corresponding to each path to equally distribute the path frames belonging to the path.

5. A frame transfer device as claimed in claim 3, further comprising a frame restoration processor for terminating the path frames received with respect to each logical path, and restoring the path frames to user packets.

6. A frame transfer device as claimed in claim 3, further comprising a frame relay processor for selecting output channels corresponding to each path to equally distribute the path frames received via input channels, and transfers the path frames.

7. A frame transfer device as claimed in claim 4, wherein the frame forming processor includes:
- buffers for storing user packets with respect to each logical path;
- a frame forming section for reading the user packets out of the buffers, and forming path frames having a fixed frames length and individual ordinal numbers; and
- a switch for selecting output channels based on identification information attached to each path frames, and outputting the path frames to the channels by round robin scheduling.

8. A frame transfer device as claimed in claim 7, wherein the frame forming section includes a means for padding a data field of a path frame to make up the path frame, when user packets stored in the buffer are not enough for the capacity of the path frame after a prescribed period of time.

9. A frame transfer device as claimed in claim 8, wherein the frame forming section forms no path frame, when there is no user packet to be transferred stored in the buffer.

10. A frame transfer device as claimed in claim 4, wherein the frame forming processor includes:
- a standby buffer for storing information of each path frame in preparation for retransmission of the path frame;
- a timer for receiving or monitoring a retransmission request from a subsequent stage for a certain period of time after transmitting the path frame, and deleting information of the path frame held in the standby buffer when the certain period of time has passed; and
- a retransmission controller for instructing the standby buffer to retransmit the path frame when there is a retransmission request.

11. A frame transfer device as claimed in claim 5, wherein the frame restoring processor includes:
- a frame restoring section for receiving path frames from the channels and detecting frame errors;
- buffers for storing the received path frames with respect to each path; and
- a packet restoring section for restoring the path frames written in the buffers to user packets according to the ordinal numbers attached to the path frames.

12. A frame transfer device as claimed in claim 5, wherein the frame restoring processor further includes:
- a timer for clocking a maximum interval of incoming path frames; and
- a retransmission controller for transmitting a retransmission request for a path frame to the preliminary stage when the timer detects the loss of the path frame.

13. A frame transfer device as claimed in claim 11, wherein the frame restoring processor further includes:
- a timer for clocking a maximum interval of incoming path frames; and
- a retransmission controller for transmitting a retransmission request for a path frame to the preliminary stage when the timer detects the loss of the path frame.

14. A frame transfer device as claimed in claim 11, wherein: the frame restoring section includes a means for reading path frames into buffers at subsequent stage using the ordinal numbers stored in respective path frames; the packet restoring section, which restores user packets, includes a means for retrieving the first user packet stored in a path frame with reference to a pointer value of the path frame, and a means for identifying the position of the head of the next user packet with reference to packet length information stored in the first user packet.

15. A frame transfer system, which is configured by interconnecting the frame transfer devices claimed in claim 14.

16. A frame transfer device as claimed in claim 3, further comprising at least one selected from: a frame forming processor, a frame restoring processor, and a frame relaying processor,
- the frame forming processor for selecting channels corresponding to each path to equally distribute the path frames belonging to the path,
- the frame restoration processor for terminating the path frames received with respect to each logical path, and restoring the path frames to user packets, and
- the frame relay processor for selecting output channels corresponding to each path to equally distribute the path frames received via input channels, and transfers the path frames.

17. A frame transfer device as claimed in claim 16, further including a control frame transmitting means for transmitting a control frame indicating initiation of data transmission at the time of setting a new OCH connection between the frame transfer devices, and a control frame indicating termination of data transmission on an existing OCH at the time of disconnecting the OCH.

18. A frame transfer device as claimed in claim 17, wherein the control frame transmitting means executes transmission control according to increase and decrease in traffic between the frame transfer devices.

19. A frame transfer device as claimed in claim 18, wherein the control frame transmitting means executes transmission control according to errors on OCHs connecting the frame transfer devices.

20. A frame transfer device, which is connected to another frame transfer device by plural physical channels, comprising:
- a means for maintaining logical paths which vary with user traffic and priority of the user traffic;
- a means for forming path frames having a fixed frame length and transfer schedule with respect to each path to transfer the user traffic,
- wherein the physical channels are optical channels that are defined by wavelengths and m logical paths are used in correspondence with n physical channels (m/n: an integer 1 or more);
- a frame forming processor for selecting channels corresponding to each path to equally distribute the path frames belonging to the path; and
- a control frame transmitting means for transmitting a control frame indicating initiation of data transmission at the time of setting a new OCH connection between the frame transfer devices, and a control frame indicating termination of data transmission on an existing OCH at the time of disconnecting the OCH, wherein the control frame transmitting means executes transmission control according to errors on OCHs connecting the frame transfer devices.

21. A frame transfer device, which is connected to another frame transfer device by plural physical channels, comprising:
- a means for maintaining logical paths which vary with user traffic and priority of the user traffic;
- a means for forming path frames having a fixed frame length and transfer schedule with respect to each path to transfer the user traffic,
- wherein the physical channels are optical channels that are defined by wavelengths and m logical paths are used in correspondence with n physical channels (m/n: an integer 1 or more);
- a frame forming processor for selecting channels corresponding to each path to equally distribute the path frames belonging to the path; and
- a control frame transmitting means for transmitting a control frame indicating initiation of data transmission at the time of setting a new OCH connection between the frame transfer devices, and a control frame indicating termination of data transmission on an existing OCH at the time of disconnecting the OCH,
- wherein the path frame length and transfer cycle are set according to an allowable delay period and burst property of user traffic.

22. A frame transfer device as claimed in claim 21, including: a means for obtaining the allowable delay period by the sum of a period for holding user packets in the buffer on transmitting side, a period for reading out the user packets as path frames, a period for transmitting the path frames on optical fibers, a period for holding the path frames in the buffer on receiving side, and a period for reading the path frames out of the buffer to restore the user packets; and a means for setting the path frame length so as to satisfy the allowable delay period.

23. A frame transfer device connectable, through plural physical channels, to another frame transfer device, comprising:
- a means for maintaining logical paths which vary with user traffic and priority of the user traffic;
- a means for forming path frames having a fixed frame length and transfer schedule with respect to each path to transfer the user traffic, wherein,
- the physical channels are optical channels that are defined by wavelengths and m logical paths are used in correspondence with n physical channels (m/n: an integer 1 or more);
- a frame forming processor for selecting channels corresponding to each path to equally distribute the path frames belonging to the path; and
- a means for requesting disposal or retransmission of a path frame, when an error is detected in the path frame.

24. A frame transfer method, comprising steps of:
connecting frame transfer devices by plural physical channels and managing logical paths varied with user traffic and priority of the traffic;
forming path frames that have a fixed frame length with respect to each logical path and operate on transfer schedule to transfer data; and
setting the path frame length and transfer cycle according to an allowable delay period and a parameter of burst property of user traffic, wherein, m logical paths are related with n physical channels, m and n are integers greater than 1, and further comprising a step of interchanging information of the paths and channels.

25. A frame transfer method as claimed in claim 24, further comprising a frame transferring step for selecting channels corresponding to each logical path, and equally distributing path frames belonging to the path.

26. A frame transfer method as claimed in claim 25, wherein the frame transferring step includes steps of: transmitting a control frame indicating initiation of data transmission at the time of setting a new physical channel between network devices; and transmitting a control frame indicating termination of data transmission on an existing physical channel at the time of disconnecting the physical channel.

27. A frame transfer method as claimed in claim 26, wherein the control frame transmitting step controls transmission of the frames according to increase and decrease in traffic between the network devices.

28. A frame transfer method as claimed in claim 26, wherein the control frame transmitting step controls transmission of the frames according to detection of errors on specified optical channels between network devices.

29. A frame transfer method as claimed in claim 26, wherein a frame transfer device includes steps of: requesting disposal or retransmission of a path frame, when an error is detected in the path frame; detecting errors in received path frames; timing a maximum interval between the incoming frames; and requesting retransmission of a path frame, when an error is detected in the path frame at the timing step.

30. A frame transfer method as claimed in claim 26, further comprising steps of: storing a path number to identify the logical path in the header part of a path frame; giving an ordinal number to the path frame; and writing a pointer field indicating positional information of the first user packet, which is stored in the payload part of the path frame.

31. A frame transfer method as claimed in claim 24, comprising steps of obtaining the allowable delay period by the sum of a period for holding user packets in the buffer on transmitting side, a period for reading out the user packets as path frames, a period for transmitting the path frames on optical fibers, a period for holding the path frames in the buffer on receiving side, and a period for reading the path frames out of the buffer to restore the user packets; and setting the path frame length so as to satisfy the allowable delay period.

32. A frame transfer method, comprising steps of:
connecting frame transfer devices by plural physical channels and managing logical paths varied with user traffic and priority of the traffic;
forming path frames that have a fixed frame length with respect to each logical path and operate on transfer schedule to transfer data; and
setting the path frame length and transfer cycle according to an allowable delay period and a parameter of burst property of user traffic, wherein,
the physical channels are optical channels, further comprising a step of transferring path frames on the optical channels,
m logical paths are related with n physical channels, m and n are integers greater than 1, and
further comprising a step of interchanging information of the paths and channels.

33. A frame transfer method as claimed in claim 32, further comprising a frame transferring step for selecting channels corresponding to each logical path, and equally distributing path frames belonging to the path.

34. A frame transfer method as claimed in claim 33, wherein the frame transferring step includes steps of: transmitting a control frame indicating initiation of data transmission at the time of setting a new physical channel between network devices; and transmitting a control frame indicating termination of data transmission on an existing physical channel at the time of disconnecting the physical channel.

35. A frame transfer method as claimed in claim 34, wherein the control frame transmitting step controls transmission of the frames according to increase and decrease in traffic between the network devices.

36. A frame transfer method as claimed in claim 34, wherein the control frame transmitting step controls transmission of the frames according to detection of errors on specified optical channels between network devices.

37. A frame transfer method as claimed in claim 34, wherein a frame transfer device includes steps of: requesting disposal or retransmission of a path frame, when an error is detected in the path frame; detecting errors in received path frames; timing a maximum interval between the incoming frames; and requesting retransmission of a path frame, when an error is detected in the path frame at the timing step.

38. A frame transfer method as claimed in claim 34, further comprising steps of: storing a path number to identify the logical path in the header part of a path frame; giving an ordinal number to the path frame; and writing a pointer field indicating positional information of the first user packet, which is stored in the payload part of the path frame.

39. A frame transfer system, including a means for defining logical paths, which varies with user traffic and priority of the traffic, between network devices interconnected by plural physical channels to transfer data; and forming path frames having a fixed frame length with respect to each logical path and operating on transfer schedule, wherein the header part of the path frame includes:
 a field for storing a path number to identify the logical path;
 a field for storing an ordinal number attached to the path frame at the time of forming the frame; and
 a pointer field indicating positional information of the first user packet, which is stored in the payload part of the path frame.

40. A frame transfer system as claimed in claim 39, wherein the network device includes a means for requesting disposal or retransmission of a frame, when an error is detected in the frame.

41. A frame transfer system as claimed in claim 39, wherein the transmission control means performs transmission control according to detection of errors on specified optical channels between the network devices.

42. A frame transfer system as claimed in claim 39, wherein the path frame length and transfer cycle are set according to an allowable delay period and burst property of user traffic.

43. A frame transfer system as claimed in claim 42, wherein the path frame length is set so as to satisfy the allowable delay period, which is obtained by the sum of a period for holding user packets in the buffer on transmitting side, a period for reading out the user packets as path frames, a period for transmitting the path frames on optical fibers, a period for holding the path frames in the buffer on receiving side, and a period for reading the path frames out of the buffer to restore the user packets.

44. A frame transfer system as claimed in claim 39, wherein the physical channels include optical channels.

45. A frame transfer system as claimed in claim 39, further including a means for using n physical channels as m logical paths, m and n are integers greater than 1, and equally distributing path frames to the corresponding channels.

46. A frame transfer system as claimed in claim 44, further including a means for using n physical channels as m logical paths, m and n are integers greater than 1, and equally distributing path frames to the corresponding channels.

47. A frame transfer system as claimed in claim 45, further including: a buffer means for storing data with respect to each logical path; and a switch means for selecting output channels based on identification information attached to path frames, and outputting the path frames to the channels by round robin scheduling.

48. A frame transfer system as claimed in claim 46, further including: a buffer means for storing data with respect to each logical path; and a switch means for selecting output channels based on identification information attached to path frames, and outputting the path frames to the channels by round robin scheduling.

49. A frame transfer system as claimed in claim 39, wherein the output network device includes: a means for controlling to read frames into a buffer at a subsequent stage using the ordinal number stored in each path frame at a frame restoring section; and a means for retrieving the first user packet stored in the path frame with reference to a pointer value of the path frame, and a means for recognizing the position of the head of the next user packet stored in the path frame with reference to packet length information stored in the user packet retrieved before and retrieving a new user packet at a packet restoring section where the path frames in the buffer are restored to the user packets.

50. A frame transfer system as claimed in claim 39, wherein the network device includes a transmission control means for transmitting a control frame to indicate initiation of data transmission on the occasion of setting a new optical channel connection between the network devices, and a control frame to indicate termination of data transmission on the occasion of disconnecting an existing optical channel.

51. A frame transfer system as claimed in claim 39, wherein the transmission control means performs transmission control according to increase and decrease in traffic between the network devices.

52. A frame transfer method, comprising steps of:
 connecting frame transfer devices by plural physical channels and managing logical paths varied with user traffic and priority of the traffic;
 forming path frames that have a fixed frame length with respect to each logical path and operate on transfer schedule to transfer data; and
 setting the path frame length and transfer cycle according to an allowable delay period and a parameter of burst property of user traffic,
 wherein the physical channels are optical channels, further comprising a step of transferring path frames on the optical channels, and
 comprising steps of obtaining the allowable delay period by the sum of a period for holding user packets in the buffer on transmitting side, a period for reading out the user packets as path frames, a period for transmitting the path frames on optical fibers, a period for holding the path frames in the buffer on receiving side, and a period for reading the path frames out of the buffer to restore the user packets; and setting the path frame length so as to satisfy the allowable delay period.

* * * * *